United States Patent
Humphries et al.

(10) Patent No.: US 10,681,078 B2
(45) Date of Patent: Jun. 9, 2020

(54) KEY THROTTLING TO MITIGATE UNAUTHORIZED FILE ACCESS

(71) Applicant: Sophos Limited, Abingdon (GB)

(72) Inventors: Russell Humphries, Surrey (GB);
Kenneth D. Ray, Seattle, WA (US);
Anthony John Merry, Kessel-lo (BE);
Harald Schutz, Linz (AT)

(73) Assignee: Sophos Limited, Abingdon (GB)

( * ) Notice: Subject to any disclaimer, the term of this patent is extended or adjusted under 35 U.S.C. 154(b) by 297 days.

(21) Appl. No.: 15/179,447

(22) Filed: Jun. 10, 2016

(65) Prior Publication Data
US 2017/0359370 A1    Dec. 14, 2017

(51) Int. Cl.
*H04L 29/06* (2006.01)
*G06F 21/55* (2013.01)
*G06F 21/62* (2013.01)
*G06F 21/57* (2013.01)

(52) U.S. Cl.
CPC ........ *H04L 63/1441* (2013.01); *G06F 21/554* (2013.01); *G06F 21/6218* (2013.01); *H04L 63/10* (2013.01); *H04L 63/1416* (2013.01); *G06F 21/57* (2013.01); *G06F 2221/2125* (2013.01)

(58) Field of Classification Search
CPC . H04L 63/1441; H04L 63/10; H04L 63/1416; G06F 21/554; G06F 21/53; G06F 9/45533; G06F 21/556; G06F 21/55; G06F 21/552
See application file for complete search history.

(56) References Cited

U.S. PATENT DOCUMENTS

| | | |
|---|---|---|
| 7,251,827 B1 | 7/2007 | Guo et al. |
| 7,539,306 B2 | 5/2009 | Ohta et al. |
| 7,783,666 B1 | 8/2010 | Zhuge et al. |
| 7,953,989 B1 | 5/2011 | Hsiang et al. |
| 8,065,724 B2 | 11/2011 | Waltenberg et al. |
| 8,281,382 B1 | 10/2012 | Sanyal et al. |
| 8,458,462 B1 | 6/2013 | Hanna et al. |
| 8,631,460 B2 | 1/2014 | Shea et al. |
| 8,806,618 B2 | 8/2014 | Livshits et al. |
| 8,837,739 B1 | 9/2014 | Sexton et al. |
| 8,892,875 B1 | 11/2014 | Baldwin et al. |

(Continued)

FOREIGN PATENT DOCUMENTS

| | | |
|---|---|---|
| EP | 2659614 | 11/2013 |
| GB | 2516972 | 2/2015 |

(Continued)

OTHER PUBLICATIONS

ISA, "PCT Application No. PCT/US16/38020 International Search Report and Written Opinion dated Apr. 18, 2017", 14 pages.

(Continued)

*Primary Examiner* — Ali S Abyaneh
*Assistant Examiner* — Shu Chun Gao
(74) *Attorney, Agent, or Firm* — Strategic Patents, P.C.

(57) ABSTRACT

A file system extension for an endpoint controls access to files by selectively decrypting files under certain conditions. Where a pattern of access to the files suggests malicious and/or automated file access activity, the file system extension may limit the rate of file access by regulating the rate at which decryption is provided to requesting processes.

19 Claims, 19 Drawing Sheets

(56) References Cited

U.S. PATENT DOCUMENTS

| | | | |
|---|---|---|---|
| 8,955,042 B2 | 2/2015 | Shea et al. | |
| 9,032,531 B1* | 5/2015 | Scorvo | G06F 21/55 |
| | | | 726/25 |
| 9,088,556 B2 | 7/2015 | Truskovsky et al. | |
| 9,251,341 B1* | 2/2016 | Northup | G06F 21/554 |
| 9,396,333 B1* | 7/2016 | Lee | G06F 21/564 |
| 9,444,824 B1 | 9/2016 | Balazs et al. | |
| 9,639,699 B1* | 5/2017 | Kurupati | G06F 21/566 |
| 2002/0071554 A1 | 6/2002 | Scheidt et al. | |
| 2002/0178353 A1* | 11/2002 | Graham | H04L 51/18 |
| | | | 713/151 |
| 2003/0159070 A1* | 8/2003 | Mayer | G06F 21/53 |
| | | | 726/22 |
| 2003/0172033 A1 | 9/2003 | Risan et al. | |
| 2004/0025007 A1 | 2/2004 | Kotnur et al. | |
| 2004/0128259 A1 | 7/2004 | Blakeley et al. | |
| 2004/0128547 A1 | 7/2004 | Laidlaw et al. | |
| 2005/0132204 A1 | 6/2005 | Gouguenheim et al. | |
| 2005/0138353 A1 | 6/2005 | Spies et al. | |
| 2005/0149745 A1 | 7/2005 | Ishidoshiro et al. | |
| 2006/0010074 A1 | 1/2006 | Zeitsiff et al. | |
| 2007/0143827 A1* | 6/2007 | Nicodemus | G06F 21/6218 |
| | | | 726/2 |
| 2008/0077994 A1 | 3/2008 | Comlekoglu et al. | |
| 2008/0195872 A1 | 8/2008 | Chow et al. | |
| 2008/0262991 A1* | 10/2008 | Kapoor | G06F 21/55 |
| | | | 706/20 |
| 2009/0089591 A1 | 4/2009 | Mattsson | |
| 2009/0097662 A1 | 4/2009 | Olechowski et al. | |
| 2009/0144545 A1 | 6/2009 | Dhuvur et al. | |
| 2009/0220088 A1 | 9/2009 | Lu et al. | |
| 2010/0153709 A1 | 6/2010 | Thomas et al. | |
| 2010/0161961 A1 | 6/2010 | Beigelman et al. | |
| 2010/0306537 A1 | 12/2010 | Cohen et al. | |
| 2010/0317420 A1* | 12/2010 | Hoffberg | G06Q 30/0207 |
| | | | 463/1 |
| 2011/0016311 A1 | 1/2011 | Durand et al. | |
| 2011/0138465 A1 | 6/2011 | Franklin et al. | |
| 2011/0238979 A1 | 9/2011 | Harp et al. | |
| 2011/0321139 A1* | 12/2011 | Jayaraman | G06F 21/51 |
| | | | 726/4 |
| 2012/0102317 A1 | 4/2012 | Mathur et al. | |
| 2012/0151553 A1* | 6/2012 | Burgess | G06F 21/00 |
| | | | 726/1 |
| 2013/0013339 A1 | 1/2013 | Goldman et al. | |
| 2013/0039491 A1 | 2/2013 | Unagami et al. | |
| 2013/0125202 A1 | 5/2013 | Sprague et al. | |
| 2013/0125247 A1 | 5/2013 | Sprague et al. | |
| 2013/0156196 A1 | 6/2013 | Jogand-Coulomb et al. | |
| 2013/0238491 A1 | 9/2013 | Bouey et al. | |
| 2013/0283033 A1 | 10/2013 | Ahuja et al. | |
| 2013/0318125 A1 | 11/2013 | Smith et al. | |
| 2014/0094159 A1* | 4/2014 | Raleigh | H04W 24/02 |
| | | | 455/418 |
| 2014/0098671 A1* | 4/2014 | Raleigh | H04L 69/14 |
| | | | 370/235 |
| 2014/0189808 A1 | 7/2014 | Mahaffey et al. | |
| 2014/0281542 A1 | 9/2014 | Bono et al. | |
| 2014/0281545 A1* | 9/2014 | Erofeev | G06F 21/6218 |
| | | | 713/171 |
| 2014/0351586 A1* | 11/2014 | Hook | H04L 9/14 |
| | | | 713/164 |
| 2014/0373143 A1* | 12/2014 | Chesla | H04L 63/1458 |
| | | | 726/22 |
| 2014/0380048 A1 | 12/2014 | He et al. | |
| 2015/0127607 A1* | 5/2015 | Savage | G06F 16/178 |
| | | | 707/610 |
| 2015/0235011 A1 | 8/2015 | Swaminathan et al. | |
| 2015/0281273 A1* | 10/2015 | Shields | G06F 21/552 |
| | | | 713/171 |
| 2015/0319185 A1* | 11/2015 | Kirti | H04L 63/1416 |
| | | | 726/23 |
| 2015/0379278 A1* | 12/2015 | Thota | G09C 1/00 |
| | | | 713/189 |
| 2015/0381656 A1 | 12/2015 | Kelson et al. | |
| 2016/0078245 A1* | 3/2016 | Amarendran | H04L 67/10 |
| | | | 713/193 |
| 2016/0191521 A1* | 6/2016 | Feroz | G06F 16/9535 |
| | | | 726/1 |
| 2016/0191544 A1 | 6/2016 | Kim et al. | |
| 2016/0191554 A1 | 6/2016 | Kaminsky | |
| 2016/0306967 A1* | 10/2016 | Hart | G06F 21/56 |
| 2017/0013000 A1* | 1/2017 | El-Moussa | H04L 63/1425 |
| 2017/0093569 A1* | 3/2017 | Roth | H04L 9/088 |
| 2017/0104768 A1 | 4/2017 | Semenko et al. | |
| 2017/0235966 A1 | 8/2017 | Ray et al. | |
| 2017/0235967 A1 | 8/2017 | Ray et al. | |
| 2017/0289179 A1* | 10/2017 | Dubuc | H04L 63/1416 |
| 2017/0302458 A1 | 10/2017 | Berger et al. | |
| 2017/0302635 A1 | 10/2017 | Humphries et al. | |
| 2017/0302653 A1 | 10/2017 | Ortner et al. | |
| 2017/0302696 A1 | 10/2017 | Schutz et al. | |
| 2018/0007014 A1 | 1/2018 | Neal | |
| 2018/0048658 A1* | 2/2018 | Hittel | G06F 21/565 |
| 2018/0075249 A1 | 3/2018 | Ray et al. | |
| 2018/0232517 A1* | 8/2018 | Roth | H04L 67/10 |
| 2019/0228172 A1 | 7/2019 | Ray et al. | |
| 2019/0349403 A1* | 11/2019 | Anderson | H04L 63/166 |
| 2020/0036747 A1 | 1/2020 | Humphries et al. | |

FOREIGN PATENT DOCUMENTS

| | | |
|---|---|---|
| WO | WO-2009095413 | 8/2009 |
| WO | WO-2016038397 | 3/2016 |
| WO | WO-2017138976 | 8/2017 |

OTHER PUBLICATIONS

"U.S. Appl. No. 15/042,916 Notice of Allowance dated Oct. 2, 2017", 7 pages.

"U.S. Appl. No. 15/098,684 Non-Final Office Action dated Oct. 3, 2017", 11 pages.

"U.S. Appl. No. 15/099,524 Non-Final Office Action dated Sep. 22, 2017", 16 pages.

"U.S. Appl. No. 15/099,542 Non-Final Office Action dated Oct. 27, 2017", 19 pages.

"U.S. Appl. No. 15/042,916, Non-Final Office Action dated Sep. 1, 2017", 15 pages.

"U.S. Appl. No. 15/042,862 Non-Final Office Action dated Dec. 19, 2017", 28 pages.

"U.S. Appl. No. 15/042,916 Notice of Allowance dated Dec. 22, 2017", 12 pages.

"U.S. Appl. No. 15/098,720 Non-Final Office Action dated Feb. 8, 2018", 19 pages.

UKIPO, Application No. GB1611484.5 Search and First Examination Report dated Feb. 14, 2017, 8 pages.

IPO, "UK Application No. 1717704.9 Search and Examination Report dated Jan. 25, 2018", 5 pages.

"U.S. Appl. No. 15/098,684 Notice of Allowance dated Oct. 15, 2018", 5 pages.

"U.S. Appl. No. 15/098,684 Notice of Allowance dated Nov. 27, 2018", 8 pages.

"U.S. Appl. No. 15/817,705 Notice of Allowance dated Oct. 17, 2018", 8 pages.

IPO, "UK Application No. 1808581.1 Search and Examination Report dated Nov. 27, 2018", 9 pages.

"U.S. Appl. No. 15/042,862 Notice of Allowance dated Aug. 10, 2018", 8 pages.

"U.S. Appl. No. 15/098,684 Notice of Allowance dated Aug. 28, 2018", 8 pages.

"U.S. Appl. No. 15/098,720 Notice of Allowance dated Aug. 28, 2018", 13 pages.

"U.S. Appl. No. 15/429,291 Non-Final Office Action dated Sep. 11, 2018", 8 pages.

"U.S. Appl. No. 15/817,705 Notice of Allowance dated Aug. 28, 2018", 11 pages.

(56) References Cited

OTHER PUBLICATIONS

WIPO, "PCT Application No. PCT/US16/38020 International Preliminary Report on Patentability dated Aug. 23, 2018", 10 pages.
"U.S. Appl. No. 15/042,862 Notice of Allowance dated Jul. 16, 2018", 21 pages.
"U.S. Appl. No. 15/042,916 Notice of Allowance dated Apr. 5, 2018", 8 pages.
"U.S. Appl. No. 15/098,684 Notice of Allowance dated May 23, 2018", 12 pages.
"U.S. Appl. No. 15/099,524 Final Office Action dated Jun. 7, 2018", 10 pages.
"U.S. Appl. No. 15/099,542 Final Office Action dated Jun. 6, 2018", 19 pages.
"U.S. Appl. No. 15/817,705 Non-Final Office Action dated Jun. 8, 2018", 26 pages.
"U.S. Appl. No. 15/042,862 Notice of Allowance dated Jan. 18, 2019", 11 pages.
"U.S. Appl. No. 15/042,862 Notice of Allowance dated Mar. 14, 2019", 8 pages.
"U.S. Appl. No. 15/042,862 Notice of Allowance dated May 1, 2019", 8 pages.
"U.S. Appl. No. 15/098,720 Notice of Allowance dated Mar. 29, 2019", 11 pages.
"U.S. Appl. No. 15/099,524 Notice of Allowance dated Feb. 14, 2019", 6 pages.
"U.S. Appl. No. 15/099,542 Non-Final Office Action dated Apr. 16, 2019", 20 pages.
"U.S. Appl. No. 15/429,291 Notice of Allowance dated Apr. 24, 2019", 10 pages.
"U.S. Appl. No. 15/817,705 Notice of Allowance dated Feb. 6, 2019", 8 pages.
"U.S. Appl. No. 15/817,705 Notice of Allowance dated Mar. 28, 2019", 8 pages.
"U.S. Appl. No. 15/817,705 Notice of Allowance dated May 6, 2019", 10 pages.
USPTO, "U.S. Appl. No. 16/248,417 Non-Final Office Action dated Jun. 13, 2019", 7 pages.
IPO, "UK Application No. 1808581.1 Examination Report dated Jun. 12, 2019", 2 pages.
USPTO, "U.S. Appl. No. 15/042,862 Notice of Allowance dated Jul. 29, 2019", 14 pages.
Shahzad, Farrukh, "Safe Haven in the Cloud: Secure Access Controlled File Encryption (SAFE) System", 2015 Science and Information conference (SAI), IEEE 2015, 6 pages.
Wang, Hoa et al., "Server Aided Ciphertext-Policy Attribute-Based Encryption", 2015 IEEE 29th International Conference on Advanced Information Networking and Applications Workshops. 2015, 5 pages.
"U.S. Appl. No. 15/099,542 Notice of Allowance dated Oct. 18, 2019", 10 pages.
"U.S. Appl. No. 16/248,417 Notice of Allowance dated Sep. 27, 2019", 8 pages.
Lekshmi, Vijaya et al., "Implementing Secure Data Access Control for Mulit-Authority Cloud Storage Systems Using Ciphertext Policy-Attribute Based Encryption", International conference on information communication and embedded systems (ICICES2014). 6 pages.

\* cited by examiner

KEY THROTTLING TO MITIGATE UNAUTHORIZED FILE ACCESS

TECHNICAL FIELD

This application relates to portable encryption, and more specifically to methods and systems for securing documents for distribution over a network.

BACKGROUND

Enterprise networks may contain valuable corporate and personal information, and they form an increasingly attractive target for malicious actors. Useful techniques for securing endpoints in a network against malicious activity are described by way of example in commonly-owned U.S. patent application Ser. No. 15/099,524 filed on Apr. 14, 2016, which is hereby incorporated by reference in its entirety.

There remains a need for improved endpoint security using encryption to prevent data leakage and other negative consequences for compromised endpoints.

SUMMARY

A file system extension for an endpoint controls access to files by selectively decrypting files under certain conditions. Where a pattern of access to the files suggests malicious and/or automated file access activity, the file system extension may limit the rate of file access by regulating the rate at which decryption is provided to requesting processes.

In an aspect, a computer program product for throttling access to encrypted files in response to potentially malicious activity may comprise computer executable code embodied in a non-transitory computer readable medium that, when executing on one or more computing devices, performs the steps of encrypting a plurality of files on an endpoint to provide a plurality of encrypted files that can be decrypted with a key, and providing a file system for accessing the plurality of files with one or more processes executing on the endpoint, where the file system includes a file system extension that applies the key to decrypt a requested one of the files in response to a request from one of the one or more processes for the requested one of the files. The code may also perform the steps of monitoring access to the plurality of files by the one or more processes for a potential indication of compromise, and limiting a rate of access to the plurality of files by the file system extension when a pattern of access to the files indicates potentially malicious automated file access. The code may further that perform the step of presenting an interactive user interface element in a display on the endpoint requesting a confirmation that a human user initiated an activity causing the pattern of access. In an aspect, the pattern of access to the files may include a communication of one or more of the plurality of files to a location remote from the endpoint.

In another aspect, a method includes encrypting a plurality of files on an endpoint to provide a plurality of encrypted files that can be decrypted with a key, and providing a file system for accessing the plurality of files with one or more processes executing on the endpoint, where the file system includes a file system extension that applies the key to decrypt a requested one of the files in response to a request from one of the one or more processes for the requested one of the files. The method may also include monitoring access to the plurality of files by the one or more processes for a potential indication of compromise, and, when an indication of compromise is detecting, limiting a rate of access to the plurality of files by the file system extension.

Implementations may include one or more of the following features. The indication of compromise may include a pattern of access to the files indicating potentially malicious automated file access. The indication of compromise may include access to a number of files beyond a predetermined threshold within a predetermined time interval. The predetermined threshold may specify a type of file. The type of file may include an application type associated with one or more of the number of files. The type of file may include a file system extension associated with one or more of the number of files. The predetermined threshold may specify a number of types of files. The predetermined threshold may specify an application requesting the number of files. The predetermined threshold may specify an attribute of the number of files. The attribute may include a business use or a sensitivity of a document. The method may further include presenting a notification in a display on the endpoint about the indication of compromise. The method may further include presenting an interactive user interface element in a display on the endpoint requesting a confirmation that a human user initiated an activity causing the indication of compromise. The method may further include adjusting at least one of the predetermined threshold and the predetermined time interval according to a pattern of file access. The indication of compromise may be based on a rule for detecting automated behavior. The indication of compromise may be based on a detection of a removable storage drive coupled to the endpoint. The method may further include providing an exception to the indication of compromise for a trusted process.

In an aspect, a system includes an endpoint, a first memory on the endpoint storing a key, a second memory on the endpoint storing a plurality of files that can be decrypted by the key, and a file system for accessing the plurality of files. The file system may include a file system extension that applies the key to decrypt a requested one of the plurality of files in response to a request from a process executing on the endpoint. The system may also include a processor configured to monitor the endpoint for an indication of compromise, and to limit a rate of access to the plurality of files by the file system extension in response to the indication of compromise.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
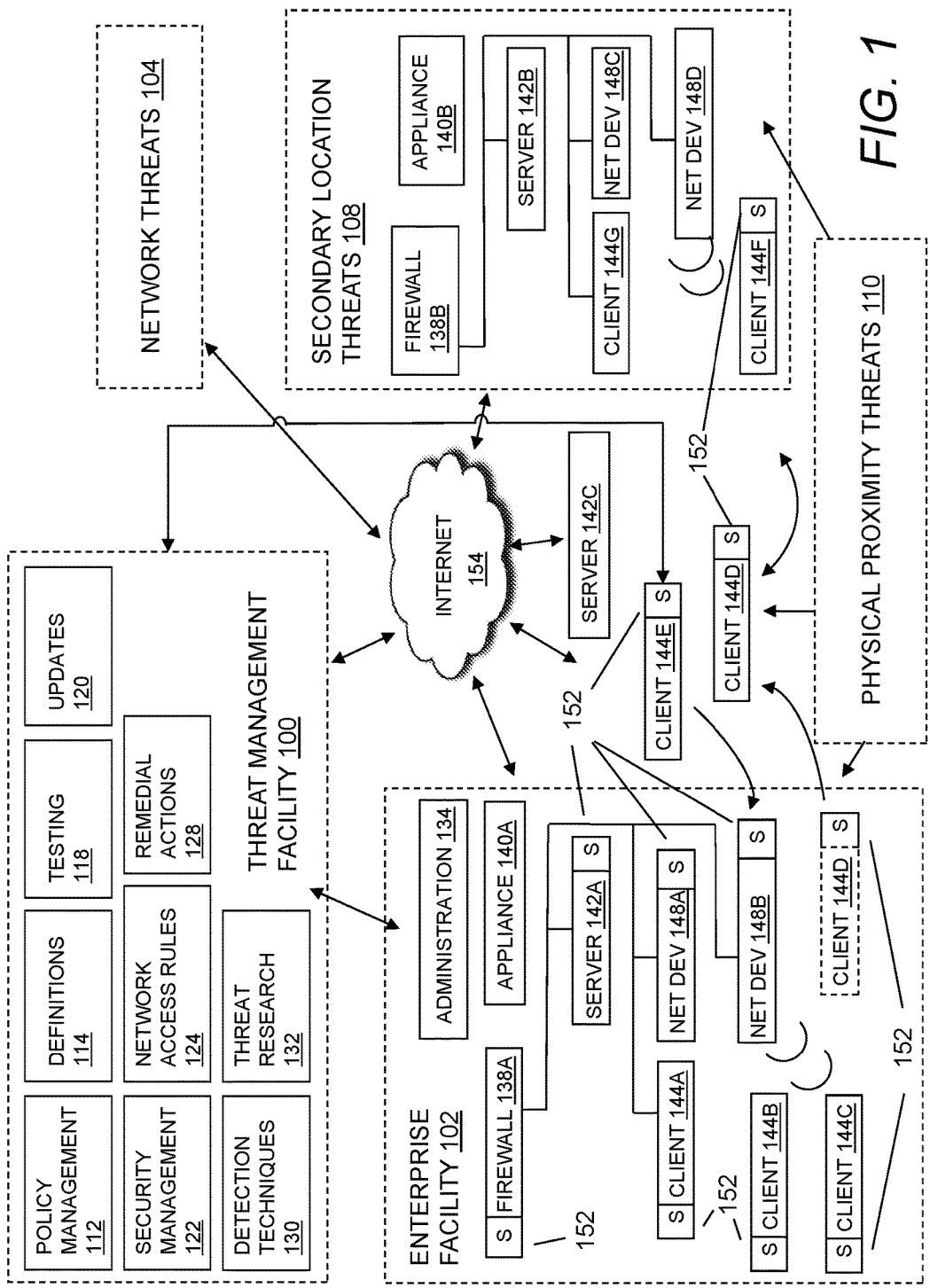
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach. It should be understood that an enterprise model is applicable to organizations and users of any size or type. For example, an enterprise may be or may include a group or association of endpoints, networks, users, and the like within or outside of one or more protected locations. It should be understood that an enterprise may include one or more offices or business locations, or one or more homes, where each location, or portions of each location, or a collection of locations may be treated as a client facility.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
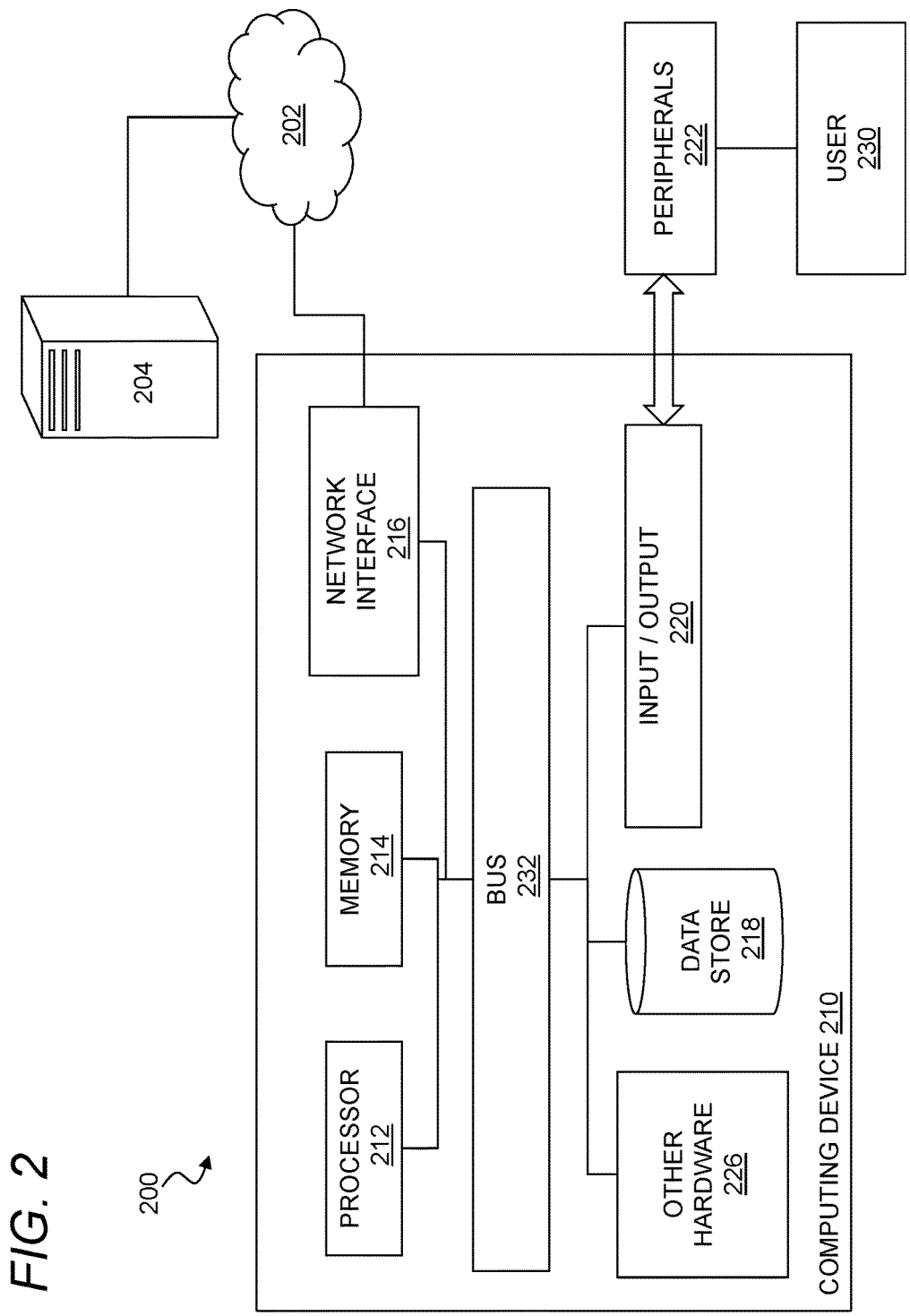
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer), and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
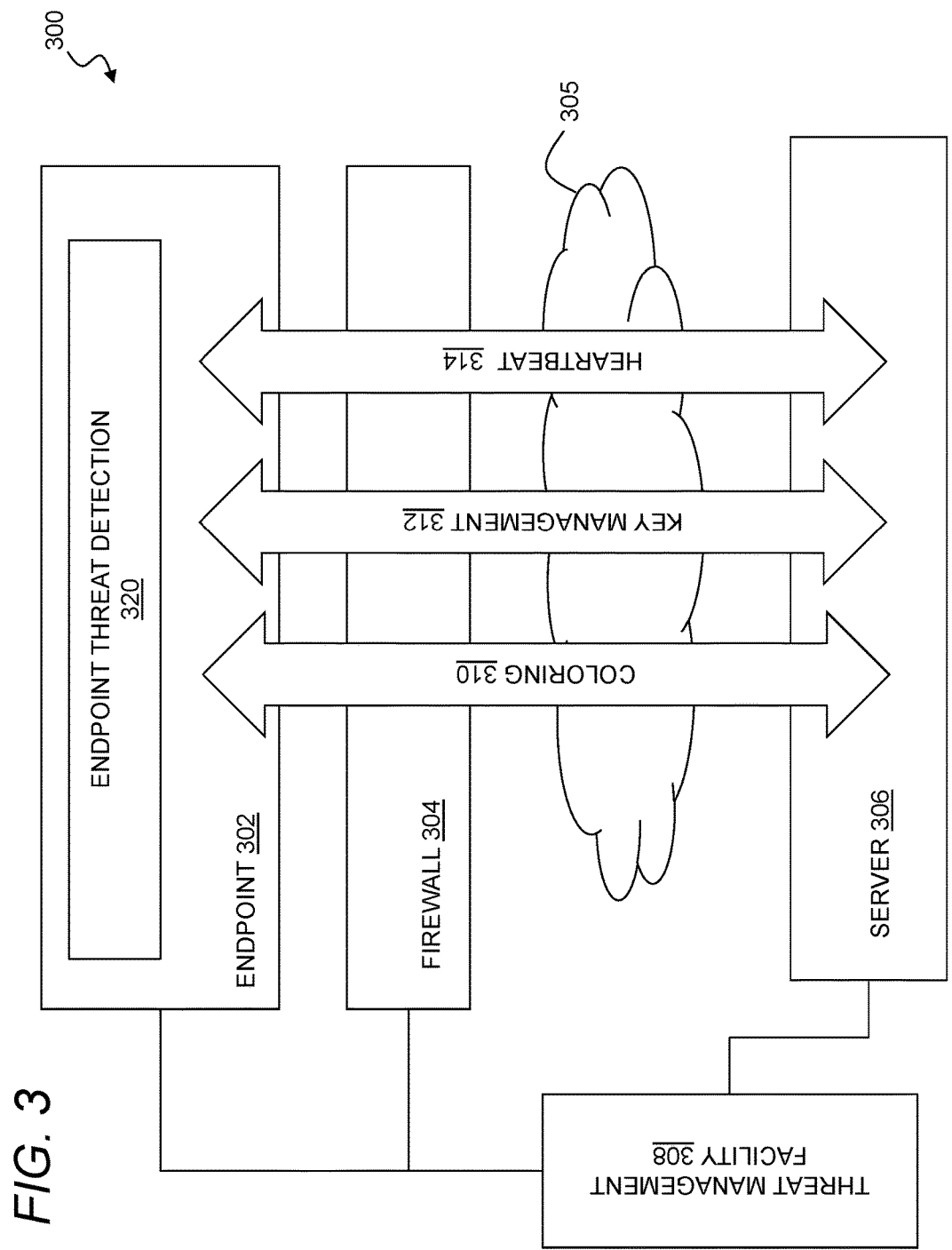
FIG. 3 illustrates a threat management system.

FIG. 3 illustrates a threat management system according to some implementations. In general, the system 300 may include an endpoint 302, a firewall 304, a server 306 and a threat management facility 308 coupled to one another directly or indirectly through a data network 305, all as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314 (or otherwise an endpoint health system), each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein. A suitable coloring system is described in greater detail below with reference to FIG. 4.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus for example, if a particular process executing on the endpoint is compromised, or potentially compromised or otherwise under suspicion, access by that process may be blocked (e.g., with access to keys revoked) in order to prevent, e.g., data leakage or other malicious activity. A suitable key management system useful in this context is described in greater detail below with reference to FIG. 5.

The heartbeat system 314 may be used to provide periodic or aperiodic information from the endpoint 302 or other system components about system health, security, status, and so forth. The heartbeat system 314 or otherwise an endpoint health system may thus in general include a health status report system for the endpoint 302, such as through the use of a heartbeat system or the like. A heartbeat may be encrypted or plaintext, or some combination of these, and may be communicated unidirectionally (e.g., from the endpoint 308 to the threat management facility 308) or bidirectionally (e.g., between the endpoint 302 and the server 306, or any other pair of system components) on any useful schedule. A suitable heartbeat system that can be used as part of the endpoint health system is described in greater detail below with reference to FIG. 6.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke access by the process to certain resources (e.g., keys or file) so that no further files can be opened, deleted or otherwise modified. More generally, the cooperation of these systems enables a wide variety of reactive measures that can improve detection and remediation of potential threats to an endpoint.

Figure 4:
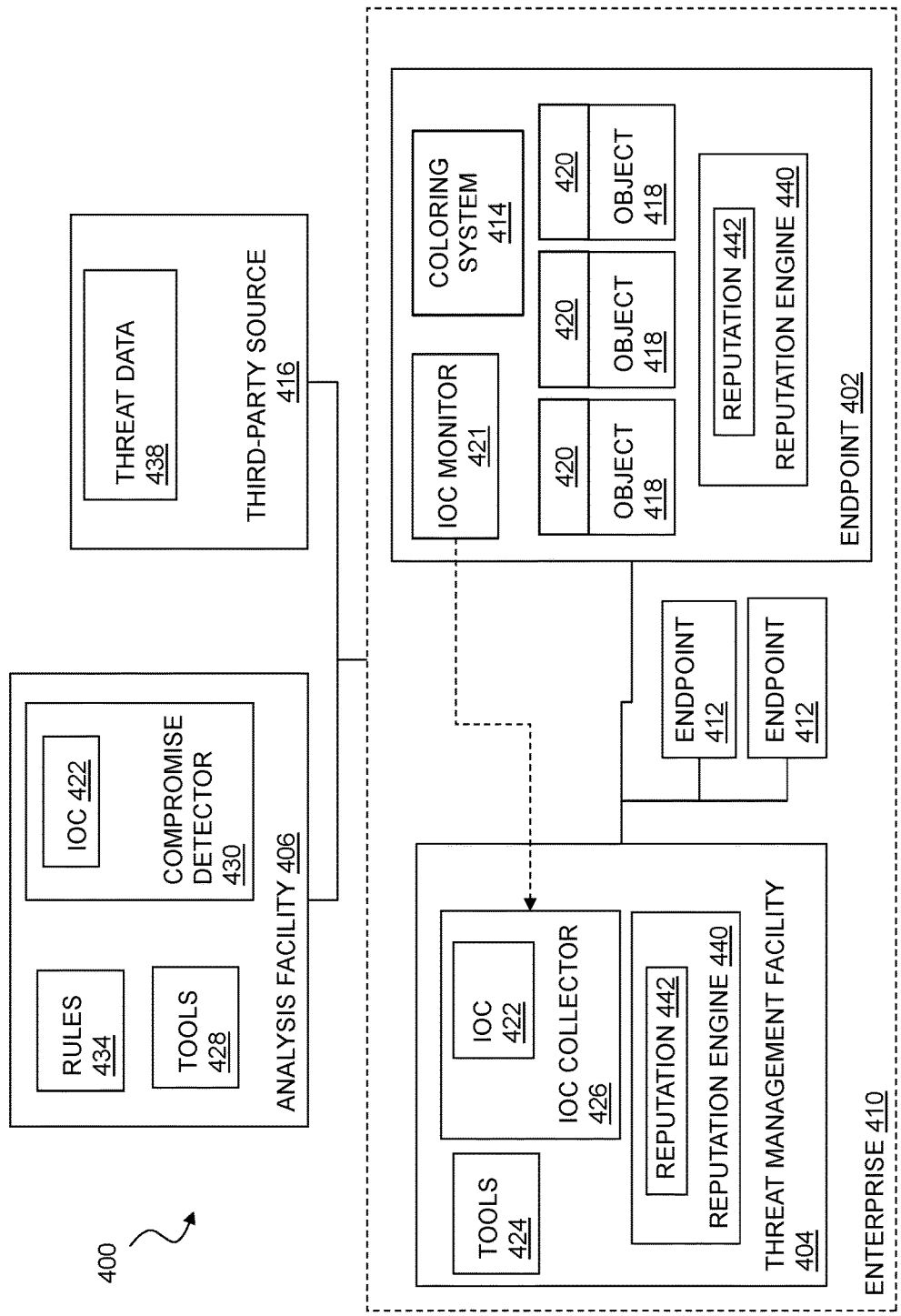
FIG. 4 illustrates a system for behavioral tracking, coloring, and generation of indications of compromise (IOCs).

FIG. 4 illustrates a system for behavioral tracking, coloring, and generation of indications of compromise (IOCs). In general, the system 400 may include a number of entities participating in a threat management process such as any of the entities and threat management processes described herein. The threat management process may for example employ techniques such as behavioral tracking, encryption, endpoint recording, reputation-based threat detection, behavioral-based threat detection, signature-based threat detection, and combinations of the foregoing, or any other suitable techniques for detecting threats to endpoints in an enterprise.

In general, the system 400 may include a number of endpoints 402, 412 and a threat management facility 404 in an enterprise 410, such as any of the enterprises described herein. An external analysis facility 406 may analyze threat data and provide rules and the like for use by the threat management facility 404 and endpoints 402, 412 in managing threats to the enterprise 410. The threat management facility 404 may reside locally (e.g., a part of, embedded within, or locally coupled to the endpoint 402), a virtual appliance (e.g., which could be run by a protected set of systems on their own network system(s)), a private cloud, a public cloud, and so forth. The analysis facility 406 may store locally-derived threat information. The analysis facility 406 may also or instead receive threat information from a third party source 416 such as MITRE Corporation or any other public, private, educational or other organization that gathers information on network threats and provides analysis and threat detection information for use by others. Each of these components may be configured with suitable programming to participate in the various threat detection and management techniques contemplated herein. The threat management facility 404 may monitor any stream of data from an endpoint 402 exclusively, or use the full context of intelligence from the stream of all protected endpoints 402, 412 or some combination of these.

The endpoint 402 may be any of the endpoints described herein, or any other device or network asset that might join or participate in the enterprise 410 or otherwise operate on an enterprise network. This may, for example, include a server, a client such as a desktop computer or a mobile computing device (e.g., a laptop computer, a wearable device, a tablet, and the like), a cellular phone, a smart phone, or other computing device suitable for participating in the enterprise 410.

In general, the endpoint 402 may include any number of computing objects such as an object 418 labeled with a descriptor 420. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

An object 418 may also or instead include a remote resource, such as a resource identified in a URL. That is, while the objects 418 in FIG. 4 are depicted as residing on the endpoint 402, an object 418 may also reside elsewhere in the system 400, while still being labeled with a descriptor 420 and tracked by the monitor 421 of the endpoint 402. The object 418 may be an item that is performing an action or causing an event, or the object 418 may be an item that is receiving the action or result of an event (i.e., the item in the system 400 being acted upon).

Where the object 418 is data or includes data, the object 418 may be encrypted or otherwise protected, or the object 418 may be unencrypted or otherwise unprotected. The object 418 may be a process or other computing object that performs an action, which may include a single event or a collection or sequence of events taken by a process. The object 418 may also or instead include an item such as a file or lines of code that are executable to perform such actions. The object 418 may also or instead include a computing component upon which an action is taken, e.g., a system setting (e.g., a registry key or the like), a data file, a URL, or the like. The object 418 may exhibit a behavior such as an interaction with another object or component of the system 400.

In one aspect, objects 418 may be described in terms of persistence. The object 418 may, for example, be a part of a process, and remain persistent as long as that process is alive. The object 418 may instead be persistent across an endpoint 402 and remain persistent as long as an endpoint 402 is active or alive. The object 418 may instead be a global object having persistence outside of an endpoint 418, such as a URL or a data store. In other words, the object 418 may be a persistent object with persistence outside of the endpoint.

Although many if not most objects 418 will typically be benign objects forming a part of a normal, operating endpoint, an object 418 may contain software associated with an advanced persistent threat (APT) or other malware that resides partially or entirely on the endpoint 402. The associated software may have reached the endpoint 402 in a variety of ways, and may have been placed manually or automatically on the endpoint 402 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 402. Further, the associated software may install from a file on the endpoint 402 (or a file remote from the endpoint 402), and the associated software may create one or more files such as data files or the like while executing. Associated software should be understood to generally include all such files and processes except where a specific file or process is more specifically noted.

A threat such as an APT may also take the form of an attack where no altered or additional software is directly added or modified on the endpoint 402. Instead, an adversary may reuse existing software on the system 400 to perform the attacks. It is for this reason that simply scanning for associated software may be insufficient for the detection of APTs and it may be preferable to detect APTs based on the behavior of the software and associated objects 418 that are used by, for, and with that software.

An object coloring system 414 may apply descriptors 420 to objects 418 on the endpoint 402. This may be performed continuously by a background process on the endpoint 402, or it may occur whenever an object 418 is involved in an action, such as when a process makes a call to an application programming interface (API) or takes some other action, or when a URL is used to initiate a network request, or when a read or a write is performed on data in a file. This may also or instead include a combination of these approaches as well as other approaches, such as by pre-labeling a file or application when it is moved to the endpoint 402, or when the endpoint 402 is started up or instantiated. In general, the object coloring system 414 may add, remove or change a color at any location and at any moment that can be practicably instrumented on a computer system.

As noted above, the term 'object' as used herein is intended to include a wide range of computing objects and as such, the manner in which particular objects 418 are labeled or 'colored' with descriptors 420 may vary significantly. Any object 418 that is performing an action may be colored at the time of and/or with a label corresponding to the action, or likewise any object 418 that is the target of the action may be colored at the time that it is used and/or with a label corresponding to a process or the like using the object 418. Furthermore, the operating system runtime representation of the object 418 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 402. For processes, each file handle may be supplemented with a pointer or other mechanism for locating a descriptor 420 for a particular object 420 that is a process. More specifically, each object 418 may be colored in any manner suitable for appending information to that object 418 so that the corresponding descriptor 420 can be retrieved and, where appropriate, updated.

The coloring system 414 may apply any suitable rules for adding and changing descriptors 420 for objects 418. For example, when a process with a certain descriptor accesses data with a different descriptor, the descriptor for the process may be updated to correspond to the data, or the descriptor for the data may be updated to correspond to the process, or some combination of these. Any action by or upon an object 418 may trigger a coloring rule so that descriptors 420 can be revised at any relevant time(s) during processing.

In one aspect, colors will not explicitly indicate a compromised security state or other good/bad types of distinctions (although they may be adapted to this use). Instead, colors may record some known information or understanding about an object 418, such as a source, a purpose, and so forth. In this context, colors will not be used to label actual or potential security compromises, but to identify inconsistencies among interacting objects 418, and to restrict or control access and use accordingly. For example, where an endpoint uses file-system-based encryption as described herein, a process that is colored as exposed to external resources (e.g., the Internet) may be prohibited from accessing cleartext data for protected files. Colors can also be used in other contexts such as intrusion prevention, routing rules, and detection of odd or questionable behavior.

In one aspect, colors may be implemented as flags associated with objects 418 that provide a short hand cache of potentially relevant information. While this information could also be obtained for an object 418 through a careful inspection of related activity logs or other data recording activities, the use of a cache of flags for coloring information makes the coloring information directly available and immediately actionable, as distinguished from post hoc forensic activities that are otherwise supported by data logging.

In one aspect, colors as contemplated herein may fall into two different categories: static colors and dynamic colors. Static colors may be explicitly applied based on, e.g., a controlling application. For example, a static color may specify a status of an application or data, or an associated type of application (e.g., productivity, mail client, messaging, browser, word processing, financial, spreadsheet, etc.). In this context, a process will generally inherit static colors from a source executable, and will permit inferences for appropriate behavior and related processes. Dynamic colors may be assigned based on direct observation of executing processes, and may not be inherited or transferred among processes (although the presence of a dynamic color may be used to draw another coloring inference upon interaction with another process). Thus, the inheritance of colors may depend in part upon the type of color that is applied, or upon explicit inheritance rules provided for a particular color.

A descriptor 420 may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT' (e.g., untrusted). The specific content of the label is unimportant, and this may be a binary flag, text string, encrypted data or other human-readable and/or machine-readable identifier, provided that the descriptor 420 can facilitate discrimination among labeled files—in this example, between trusted objects 418 and untrusted objects 418 so that, e.g., trusted data can be selectively decrypted or encrypted for use with trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 420 may provide a multi-tiered or hierarchical description of the object 418 including any information useful for characterizing the object 418 in a threat management context. For example, in one useful configuration the descriptor 420 may include a type or category, static threat detection attributes, and an explicit identification. The type or category for the object 418 may be any category or the like that characterizes a general nature or use of the object 418 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application:spreadsheet,' 'application:word_processing,' and so forth. Such colors may be directly inferred from a single action, a sequence of actions, or a combination of actions and other colors, including, e.g., colors of processes and files related to a particular action, or other objects 418 that provide context for a particular action or group of actions. One or more colors may also or instead be explicitly provided by a user or a process, or otherwise automatically or manually attributed to computer objects as contemplated herein.

The static threat detection attributes may be any readily ascertainable characteristics of the object 418 useful in threat detection. This may, for example, include an antivirus signature, a hash, a file size, file privileges, a process user, a path or directory, declarations of permissions, an access (e.g., a resource access, or an API access), and so forth. Static threat detection attributes may also include attributes that are derived by or supplied from other sources. For example, static threat detection attributes may include a reputation for an object 418, which may be expressed in any suitable or useful level of granularity such as with discrete categories (trusted/untrusted/unknown) or with a numerical score or other quantitative indicator. The explicit identification may, in general, be what an object 418 calls itself, e.g., a file name or process name.

Some actions may transfer colors from a subject of the action to the target of the action. For example, when a process creates sub-processes, the sub-processes may inherit the colors of its parent(s). By way of another example, when a process is initially loaded from an executable, it may inherit the color(s) stored in the file system for or with the executable.

In general, the descriptor 420 may be provided in any suitable format. The descriptor 420 may for example be formed as a vector of binary flags or other attributes that form the 'color' or description of an object 418. The descriptor 420 may also, where appropriate, include scalar quantities for certain properties. For example, it may be relevant how many times a system file was accessed, how many file handles a process has open, how many times a remote resource was requested or how long a remote resource is connected, and this information may be suitably included in the descriptor 420 for use in coloring objects with the coloring system 414 and applying rules for IOC detection by the IOC monitor 421.

An indication of compromise (IOC) monitor 421 may be provided to instrument the endpoint 402 so that any observable actions by or involving various objects 418 can be detected. As with the coloring system 414, it will be understood that the types of observable actions will vary significantly, and the manner in which the endpoint 402 is instrumented to detect such actions will depend on the particular type of object 418. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may create suitable instrumentation for any computing object so that it may be monitored by the IOC monitor 421.

It will be noted that suitable instrumentation may be used for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 421 applies rules to determine when there is an IOC 422 suitable for reporting to a threat management facility 404. It will be understood that an endpoint 402 may, in suitable circumstances and with appropriate information, take immediate local action to remediate a threat. However, the monitor 421 may advantageously accumulate a sequence of actions, and still more advantageously may identify inconsistencies or unexpected behavior within a group of actions with improved sensitivity by comparing descriptors 420 for various objects 418 involved in relevant actions and events. In this manner, rules may be applied based upon the descriptors 420 that better discriminate malicious activity while reducing the quantity and frequency of information that must be communicated to a remote threat management facility 404. At the same time, all of the relevant information provided by the descriptors 420 can be sent in an IOC 422 when communicating a potential issue to the threat management facility 404. For example, during the course of execution, a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. When this last action is observed, an inconsistency in the various color descriptors between the subject of the action—the externally exposed browser process—and the target of the action may result in a well-defined IOC, which may be directly processed with immediate local action taken. The IOC may also or instead be reported externally as appropriate.

Thus, an endpoint 402 in an enterprise 410 may be instrumented with a coloring system 414 and monitor 421 to better detect potentially malicious activity using descriptors 420 that have been selected for relevance to threat detection along with a corresponding set of rules developed for the particular descriptors 420 that are being used to label or color various objects 418. By way of example, the object 418 may be a web browser that starts off being colored as a 'browser' and an 'internet facing' application. Based on this descriptor 420, a range of behaviors or actions may be considered normal, such as accessing remote network resources. However, if an object 418 colored with this descriptor 420 attempted to elevate privileges for a process, or to access a registry or system files, then this inconsistency in action may trigger a rule violation and result in an IOC 422.

In general, any action or series of actions that cumulatively invoke a particular reporting or action rule may be combined into an IOC 422 and communicated to the threat management facility 404. For example, an IOC 422 may include a malicious or strange behavior, or an indication of a malicious or strange behavior. The IOC 422 may be a normalized IOC that expresses one or more actions in a platform independent manner. That is, the IOC 422 may express a malicious behavior or suspected malicious behavior without reference to platform-specific information such as details of an operating system (e.g., iOS, MacOS, Windows, Android, Linux, and so forth), hardware, applications, naming conventions, and so forth. Thus, a normalized IOC may be suitable for identifying a particular threat across multiple platforms, and may include platform independent processes, actions, or behaviors, or may express such process, actions, or behaviors in a platform independent manner. The normalized IOC may be generated from the IOC 422, e.g., it may be a converted version of the IOC 422 suitable for use with multiple platforms, or it may simply be any IOC 422 that has been created in a platform independent form. Process colorization (i.e., using the coloring system 414) as described herein may be used to create a normalized IOC.

In general, a threat management facility 404 for the enterprise 410 may include an IOC collector 426 that receives the IOC 422 from the endpoint 402 and determines an appropriate action. This may include any suitable remedial action, or where one or more IOCs 422 are inconclusive, continued monitoring or increased monitoring as appropriate.

The threat management facility 404 may provide a variety of threat management or monitoring tools 424, any of which may be deployed in response to IOCs 422 collected by the IOC collector 426. These tools 424 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 406 may provide a remote processing resource for analyzing malicious activities and creating rules 434 suitable for detecting IOCs 422 based on objects 420 and descriptors 420. It is generally contemplated that suitable attributes of certain descriptors 418 and one or more rules 434 may be developed together so that objects 418 can be appropriately labeled with descriptors 420 that permit invocation of rules 434 and creation of IOCs 422 at appropriate times. The analysis facility 406 may include a variety of analysis tools 428 including, without limitation, tools for regular expression, whitelisting/blacklisting, crowd sourcing, identifiers, and so forth. The analysis tools 428 may also or instead include information and tools such as URL look-ups, genotypes, identities, file look-up, reputations, and so forth. The analysis facility 406 may also provide numerous related functions such as an interface for receiving information on new, unknown files or processes, and for testing of such code or content in a sandbox on the analysis facility 406.

The analysis facility 406 may also or instead include a compromise detector 430, where the compromise detector 430 is configured to receive new threat information for analysis and creation of new rules and descriptors as appropriate, as well as corresponding remedial actions. The compromise detector 430 may include any tools described herein or otherwise known in the art for detecting compromises or evaluating new threats in an enterprise 410.

In general, a rule 434 may be manually created with corresponding human-readable semantics, e.g., where a process is labeled as a browser process or other category or type that can be interpreted by a human. It should, however, be appreciated that the compromise detector 430 may also be configured to automatically generate descriptors 420 and rules 434 suitable for distribution to a threat management facility 404 and an endpoint 402. In this latter mode, the meaning of a particular descriptor 420 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 406 may be within an enterprise 410, or the analysis facility 406 may be external to the enterprise 410 and administered, for example, by a trusted third party. Further, a third-party source 416 may provide additional threat data 438 or analyses for use by the analysis facility 406 and the threat management facility 404. The third-party resource 416 may be a data resource that provides threat data 438 and analyses, where the threat data 438 is any data that is useful in detecting, monitoring, or analyzing threats. For example, the threat data 438 may include a database of threats, signatures, and the like. By way of example, the third-party resource 416 may be a resource provided by The MITRE Corporation.

The system 400 may include a reputation engine 440 storing a plurality of reputations 442. The reputation engine 440 may include a reputation management system for the generation, analysis, identification, editing, storing, etc., of reputations 442. The reputation engine 440 may include reputation-based filtering, which may be similar to the reputation filtering discussed above with reference to FIG. 1. The reputation engine 440 may be located on the threat management facility 404 or the endpoint 402 as shown in FIG. 4, or the reputation engine 440 may be located elsewhere in the system 400. The reputation engine 440 may receive an IOC 422 or a stream of IOCs 422, and may generate or utilize reputations 442 for the IOCs 422. The reputation engine 440 may also or instead receive actions, behaviors, events, interactions, and so forth, and may generate or utilize reputations 442 for any of the foregoing. The reputation engine 440 may generate or revise a reputation 442 based on behaviors, actions, events, interactions, IOCs 422, other reputations 442, a history of events, data, rules, state of encryption, colors, and so forth. The reputation engine 440 may utilize a third-party resource, e.g., for the third-party resource's reputation data.

The reputations 442 may include reputations for any of the objects 418 as described herein. In general, the reputations 442 may relate to the trustworthiness of the objects 418 or an attribute thereof (e.g., the source of the object 418, a behavior of the object 418, another object interacting with the object 418, and so forth). The reputations 442 may include lists of known sources of malware or known suspicious objects 418. The reputations 442 may also or instead include lists of known safe or trusted resources or objects 418. The reputations 442 may be stored in a reputations database included on the reputation engine 440 or located elsewhere in the system 400. The reputations 442 may be expressed in any suitable or useful level of granularity such as with discrete categories (e.g., trusted, untrusted, unknown, malicious, safe, etc.) or with a numerical score or other quantitative indicator. The reputations 442 may also be scaled.

In general, in the system 400 of FIG. 4, a malicious activity on the endpoint 402 may be detected by the IOC monitor 421, and a corresponding IOC 422 may be transmitted to the threat management facility 404 for remedial action as appropriate. The threat management facility 404 may further communicate one or more IOCs 422 to the analysis facility 406 for additional analyses and/or resolution of inconclusive results. Other details and variations are provided below. While the use of coloring and IOCs as contemplated herein can improve threat detection and remediation in a number of ways, the system 400 can be further improved with granular control over access to endpoint data using an encryption system. A system for key-based management of processes and files on an endpoint is now discussed in greater detail.

Figure 5:
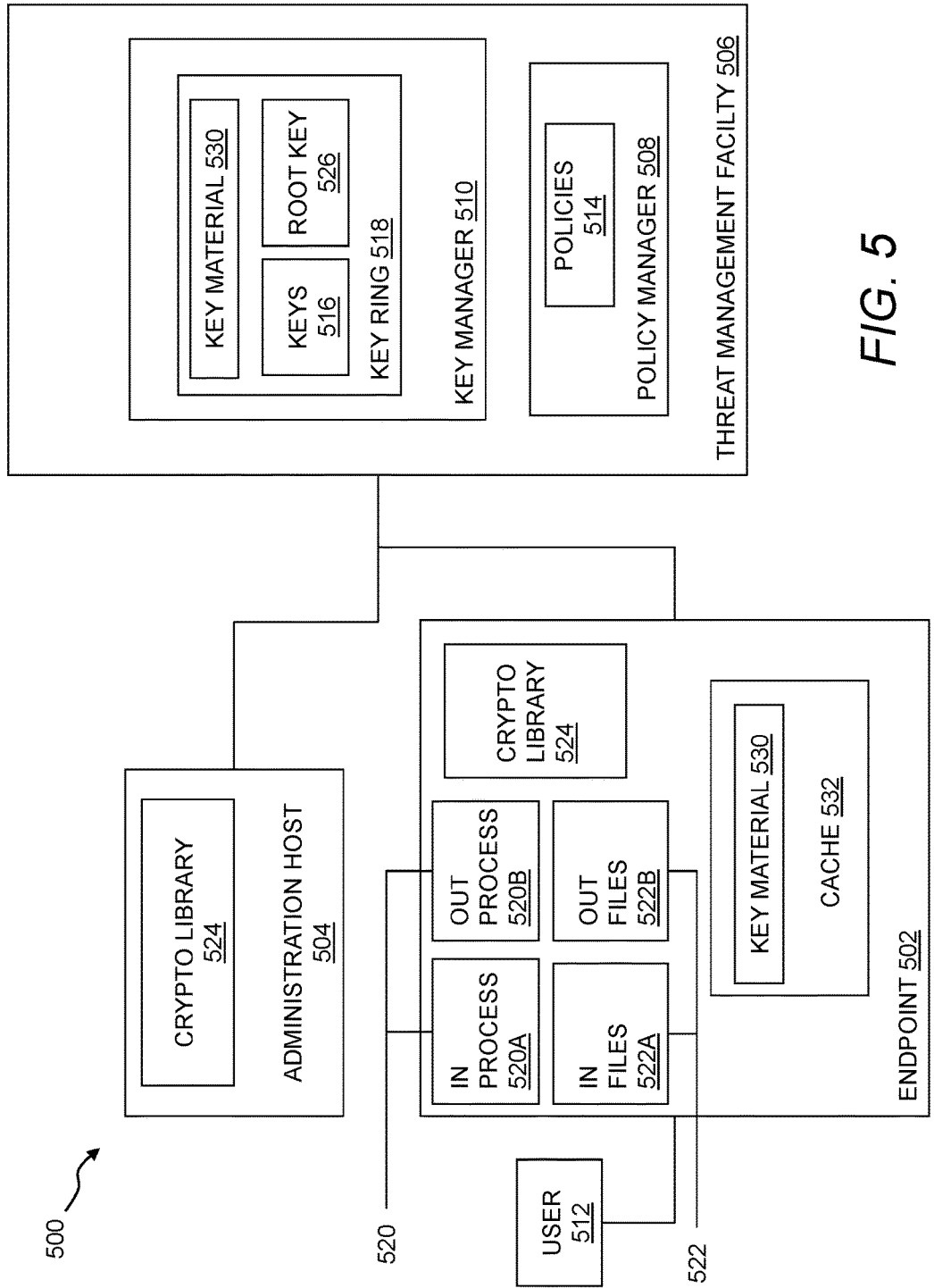
FIG. 5 illustrates a system for encryption management.

FIG. 5 illustrates a system for encryption management. Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be local, remote, virtual, disposed in a cloud, or the like.

The endpoints 502 may be any of the endpoints as described herein, e.g., with reference to the other figures. The endpoints 502 may also or instead include other end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG. 5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT. By coloring objects in this manner and basing key access on the corresponding color, the "IN" software objects may operate in a protected environment that objectively appears to be in compliance with the policies 514. Other files and processes may still be used on the endpoint 502, but they will operate in an "OUT" or unprotected environment that cannot obtain access to any of the "IN" content or functionality.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the entire endpoint 502 is OUT—that is, out of compliance with one or more policies 514, the endpoint 502 will not have key access or access to any protected content. Conversely, if the endpoint 502 is IN, the endpoint 502 may have access to protected content. Thus in one aspect, the notion of IN/OUT may be applied at an endpoint level, and data protection may be a consequence of endpoint protection. Endpoint protection may also or instead be applied at a more granular level, e.g., by determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include any policies 514 relating to secure operation of endpoints 502 in an enterprise. This may, for example, include hardware configuration policies, software configuration policies, communication policies, update policies, or any other policies relating to, e.g., the configuration of an endpoint 502, communications by an endpoint 502, software executing on an endpoint 502 and so forth. Policies 514 may include usage criteria based on, e.g., signatures, indications of compromise, reputation, user identity, and so forth. With respect to the key management system contemplated herein, the policies 514 may include a cryptographic protocol design, key servers, user procedures, and other relevant protocols, or these cryptographic protocols may be provided elsewhere for use by the policy manager 508. The policies 514 may also include any rules for compliance including those mentioned above or any other suitable rules or algorithms that can be applied to determine whether objects and components are 'IN' or 'OUT' as contemplated herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 516 may include cryptographic keys in a cryptosystem, i.e., decryption keys. In one aspect, the keys 516 may be disposed on one key ring 518 using one root key 526. In general, the keys 516 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), elliptic curve cryptography (ECC), and so forth. The cryptosystem may also or instead include any suitable public key infrastructure or the like supporting the distribution and use of keys for encryption, digital signatures, and so forth.

The key ring 518 may facilitate simplified management of the system 500. For example, by reducing the data protection system down to a single key ring 518, the system can eliminate or reduce the overhead for management of keys 516. In one aspect, all of the data on a key ring 518 is protected by one root key 526. By reducing the data protection system down to a single key ring 518 protected by one root key 526, all privileged users 512 on uncompromised platforms can have access to all protected data. In this embodiment, data is either 'IN' (i.e., encrypted), or it's 'OUT' (i.e., not encrypted). In one aspect, the default system does not include any additional level of granularity of access control.

The cryptography library 524 may be disposed on the administration host 504 as shown in FIG. 5. The cryptography library 524 may also be disposed on the endpoint 502, e.g., in a web browser, or it may be disposed on another component of the system 500, or any combination of these. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein. As noted above, an enterprise that systematically uses coloring and indications of compromise can be improved through the use of a synchronized or integrated key management system as contemplated herein. This system may be still further improved with the addition of a heartbeat system that communicates heartbeats from an endpoint containing health and status information about the endpoint. A suitable heartbeat system is now described in greater detail.

Figure 6:
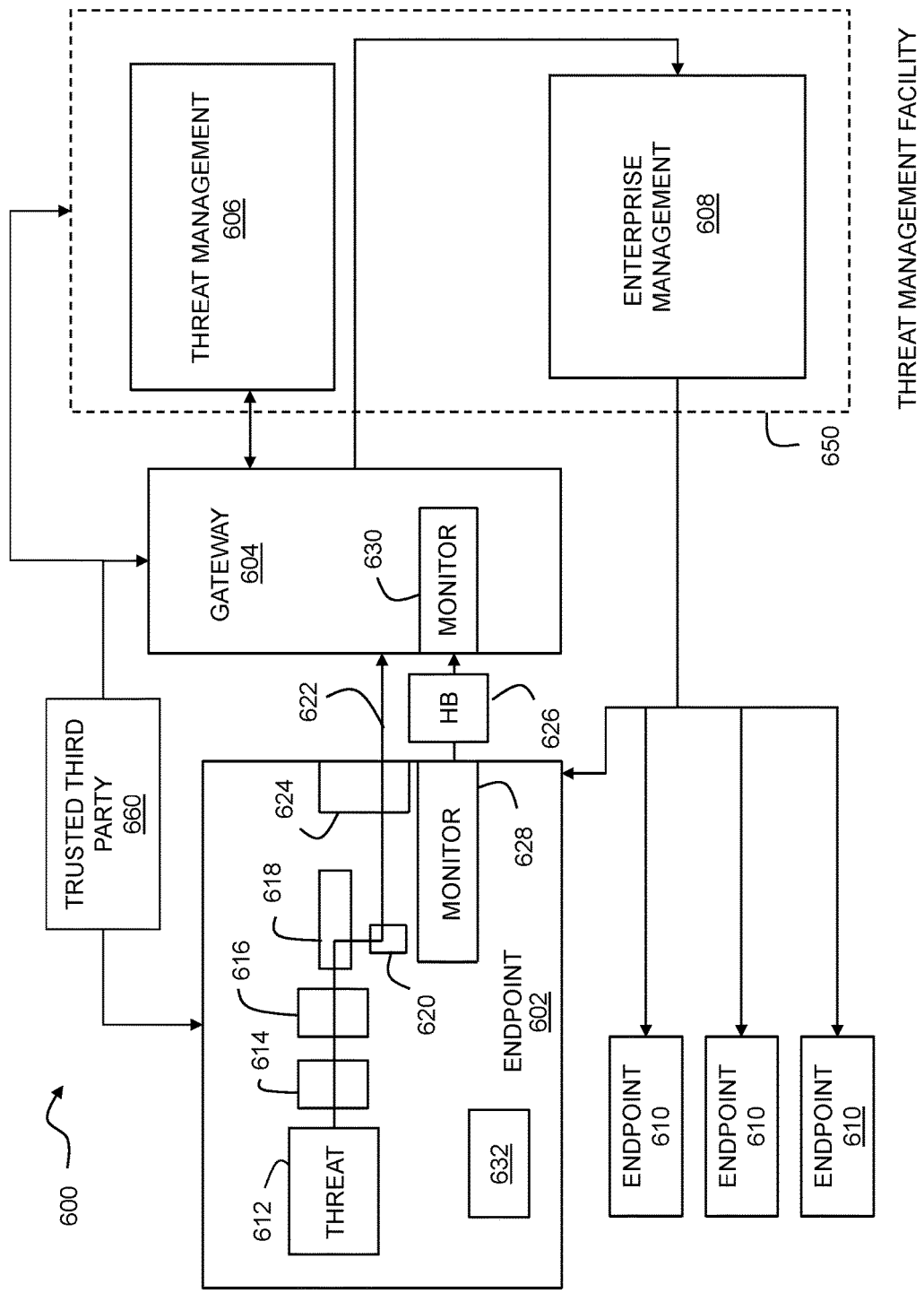
FIG. 6 illustrates a threat management system using heartbeats.

FIG. 6 illustrates a threat management system using heartbeats. In general, a system 600 may include an endpoint 602, a gateway 604, a threat management system 606, and an enterprise management system 608 that manages an enterprise including the endpoint 602, the gateway 604, and one or more additional endpoints 610. Each of these components may be configured with suitable programming to participate in the detection and remediation of an advanced persistent threat (APT) or other malware threat as contemplated herein. Although the term "gateway" is used for the device between an endpoint and an external network, it will be appreciated that this device may also or instead include a switch, router, firewall, and/or other network elements, any of which may be included in the "gateway" as that term is used herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, log a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a health monitor 628 within the endpoint 602, and may be transmitted to a remote health monitor 630, for example, at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise polices, and other evaluation techniques. The remote health monitor 630 may also or instead be provided at the threat management facility 650, for example as part of the threat management system 606 or the enterprise management system 608.

The heartbeat 626 may be secured in any suitable manner so that the health monitor 630 can reliably confirm the source of the heartbeat 626 and the status of the endpoint 602. To this end, the heartbeat 626 may be cryptographically signed or secured using a private key so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard or varying algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor 628 or remote health monitor 630.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A delay or disappearance of the heartbeat 626 from the endpoint 602 may indicate that the endpoint 602 has been compromised; however this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 6 as a threat management facility 650 that includes the threat management system 606 and the enterprise management system 608. It will be understood that either or both of these system may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for malware (e.g., advanced persistent threats) as contemplated herein. It also should be understood that the heartbeat may be monitored and/or managed by the threat management system 606, the enterprise management system 608, or another component of the threat management facility 650.

The system 600 may include a certificate authority 660 or similar trust authority or the like (shown as a "trusted third party" in the figure). In order to provide a meaningfully secure heartbeat 626, the heartbeat 626 may be secured with reference to a trusted authority such as a certificate authority 660 that can issue cryptographic certificates allowing other entities to rely on assertions about identity (e.g., by enabling verification with a trusted third party), and to enable cryptographically secure communications. The cryptographic techniques for creating and using such certificates and relationships are well known, and are not repeated here. The certificate authority 660 may be administered by the enterprise management system 608 or some other internal resource of the enterprise, or the certificate authority 660 may be administered by a trusted third party such as any of a variety of commercially available certificate authorities or the like. Thus, the certificate authority 660, or some other similar cloud service or the like, may operate as a security broker to register, e.g., endpoints 602, 610, the gateway 604, the threat management facility 650, and so forth, and provide cryptographic material for each of the other trusting entities to securely communicate with one another.

Once registered with the certificate authority 660 in this fashion, the heartbeat may be used to establish trust between the endpoint 602 and other entities, and to validate the source of the heartbeat 626 when it is received. More generally, a heartbeat 626 secured in this manner may provide an encrypted channel between network entities such as an endpoint 602 and the gateway 604 (or a firewall or the like). The nature of the communication may provide a technique for validating the source, as well as obfuscating the contents with encryption. Thus when, for example, the endpoint 602 provides information about a good/healthy state or a bad/compromised state, the recipient may rely on this state information and act accordingly.

Figure 7:
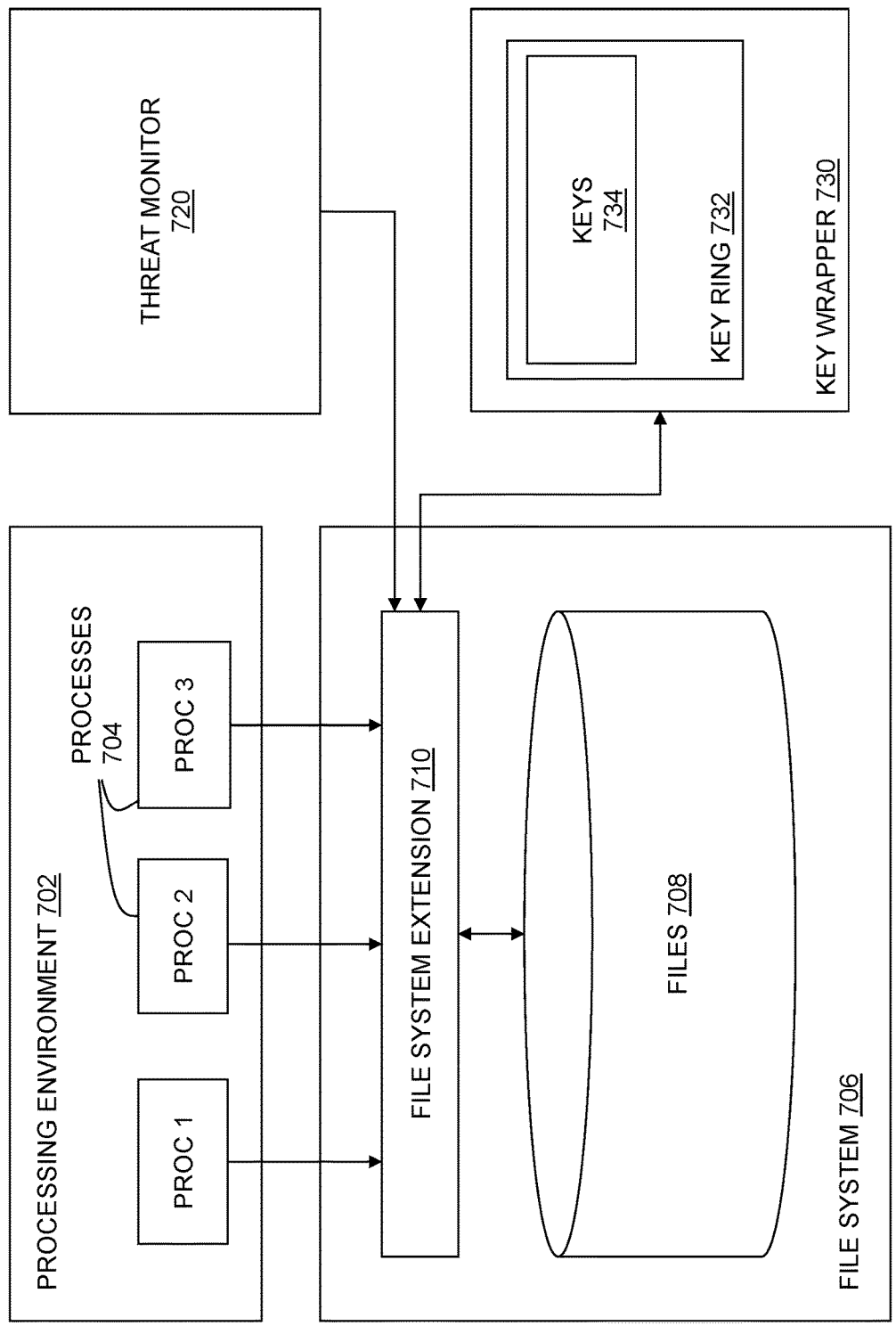
FIG. 7 shows an architecture for endpoint protection in an enterprise network security system.

FIG. 7 shows an architecture for endpoint protection in an enterprise network security system. In general, an endpoint may include a processing environment 702, a file system 706 (such as a data storage system or the like), a threat monitor 720 and a key wrapper 730.

The processing environment 702 may, for example, be any environment such as an operating system or the like suitable for executing one or more processes 704.

Each process 704 may be an instance of a software application, computer program, portion of a computer program or other code executing within the processing environment 702. A process 704 may execute, e.g., on a processor, group of processors, or other processing circuitry or platform for executing computer-executable code. A process 704 may include executable computer code, as well as an allocation of memory, file descriptors or handles for data sources and sinks, security attributes such as an owner and any associated permissions, and a context including the content of physical memory used by the process 704. A process 704 may be or may include one or more threads. More generally, a process 704 may include any code executing on an endpoint such as any of the endpoints described herein.

The file system 706 may include a data storage system or the like, e.g., where a data store including one or more files (e.g., the files 708 shown in the figure) is included as part of the data storage system. The file system 706 may be generally associated with an operating system that provides the processing environment 702, and serves as an intermediary between processes 704 executing in the processing environment 702 and one or more files 708 accessible to the endpoint. The file system 706 may provide a directory structure or other construct to facilitate organization of the files 708, and the file system 706 generally supports file functions such as creating, deleting, opening, closing, reading, writing, and so forth.

An extension 710 may be included in the file system 706 by modifying the operating system kernel. While other programming techniques may be employed to perform the functions of an extension 710 as contemplated herein, direct modifications to or additions to the operating system permit the extension 710 to operate transparently to the processing environment 702 and the processes 704 without requiring any modifications or adaptations. The extension 710 may, for example, be implemented as a file system filter (in a MICROSOFT WINDOWS environment) or a mount point to a directory (in an APPLE iOS environment). The extension 710 to the files system as contemplated herein performs two concurrent functions. First, the extension 710 communicates with a threat monitor 720 in order to receive updates on the security status and exposure status of the processes 704 or the endpoint. Second the extension 710 communicates with a key wrapper 730 that provides key material for encrypting and decrypting data in the files 708. Finally, the extension 710 operates to conditionally provide encryption and decryption of the files 708 for the processes 704 based on a current security or exposure state, as described in greater detail below.

The threat monitor 720 may include any suitable threat monitoring, malware detection, antivirus program or the like suitable for monitoring and reporting on a security state of an endpoint or individual processes 704 executing thereon. This may include local threat monitoring using, e.g., behavioral analysis or static analysis. The threat monitor 720 may also or instead use reputation to evaluate the security state of processes 704 based on the processes 704 themselves, source files or executable code for the processes 704, or network activity initiated by the processes 704. For example, if a process 704 requests data from a remote URL that is known to have a bad reputation, this information may be used to infer a compromised security state of the endpoint. While a threat monitor 720 may operate locally, the threat monitor 720 may also or instead use remote resources such as a gateway carrying traffic to and from the endpoint, or a remote threat management facility that provides reputation information, malware signatures, policy information and the like for the endpoint and other devices within an enterprise such as the enterprise described above.

The threat monitor 720 may also or instead monitor the health of one or more of the system, an endpoint, a process 704, and so forth. The health monitoring may be used to provide periodic or aperiodic information from one or more system components about system health, security, status, and so forth. Implementations may include using the health monitoring for controlling access, e.g., to files 708, to keys 734, to key material for encrypting and decrypting individual files 708, and so forth.

In general, the threat monitor 720 provides monitoring of a security state and an exposure state of the endpoint. The security state may, for example, be 'compromised', 'secure', or some other state or combination of states. This may be based on detections of known malware, suspicious activity, policy violations and so forth. The exposure state may be 'exposed' or 'unexposed', reflecting whether or not a particular process 704 or file 708 has been exposed to potentially unsafe content. Thus, exposure may not necessarily represent a specific threat, but the potential for exposure to unsafe content. This may be tracked in a variety of ways, such as by using the coloring system described above with reference to FIG. 5.

The key wrapper 730 may contain a key ring 732 with one or more keys 734 for encrypting and decrypting files 708. The key ring 732 may be cryptographically protected within the key wrapper 730 in order to prevent malicious access thereto, and the key wrapper 730 may communicate with the extension 710 to provide keys 734 for accessing the files 708 at appropriate times, depending, for example, on whether processes 704 are secure or exposed. In one aspect, the files 708 are stored in a non-volatile memory such as a disk drive, or in a random access memory that provides a cache for the disk drive, and the key wrapper 730 may be stored in a separate physical memory such as a volatile memory accessible to the operating system and the extension 710 but not to processes 704 executing in the user space of the processing environment 702.

In one aspect, every document or file on the endpoint may have a separate key. This may be, for example, a unique, symmetric key that can be used for encryption and decryption of the corresponding file. The key wrapper 730 may control access to the key material for encrypting and decrypting individual files, and may be used by the extension 710 to control access by individual processes 704 executing on the endpoint. As described herein, the extension 710 may generally control access to files 708 based on an exposure state, a security state, or other context such as the user of a calling process or the like. In the event of a severe compromise, or a detection of a compromise independent of particular processes, a key shredding procedure may be invoked to destroy the entire key wrapper 730 immediately and prevent any further access to the files 708. In such circumstances, the keys can only be recovered by the endpoint when a remediation is confirmed. Alternatively, the files may be accessed directly and decrypted from a secure, remote resource that can access the keys 734.

Figure 8:
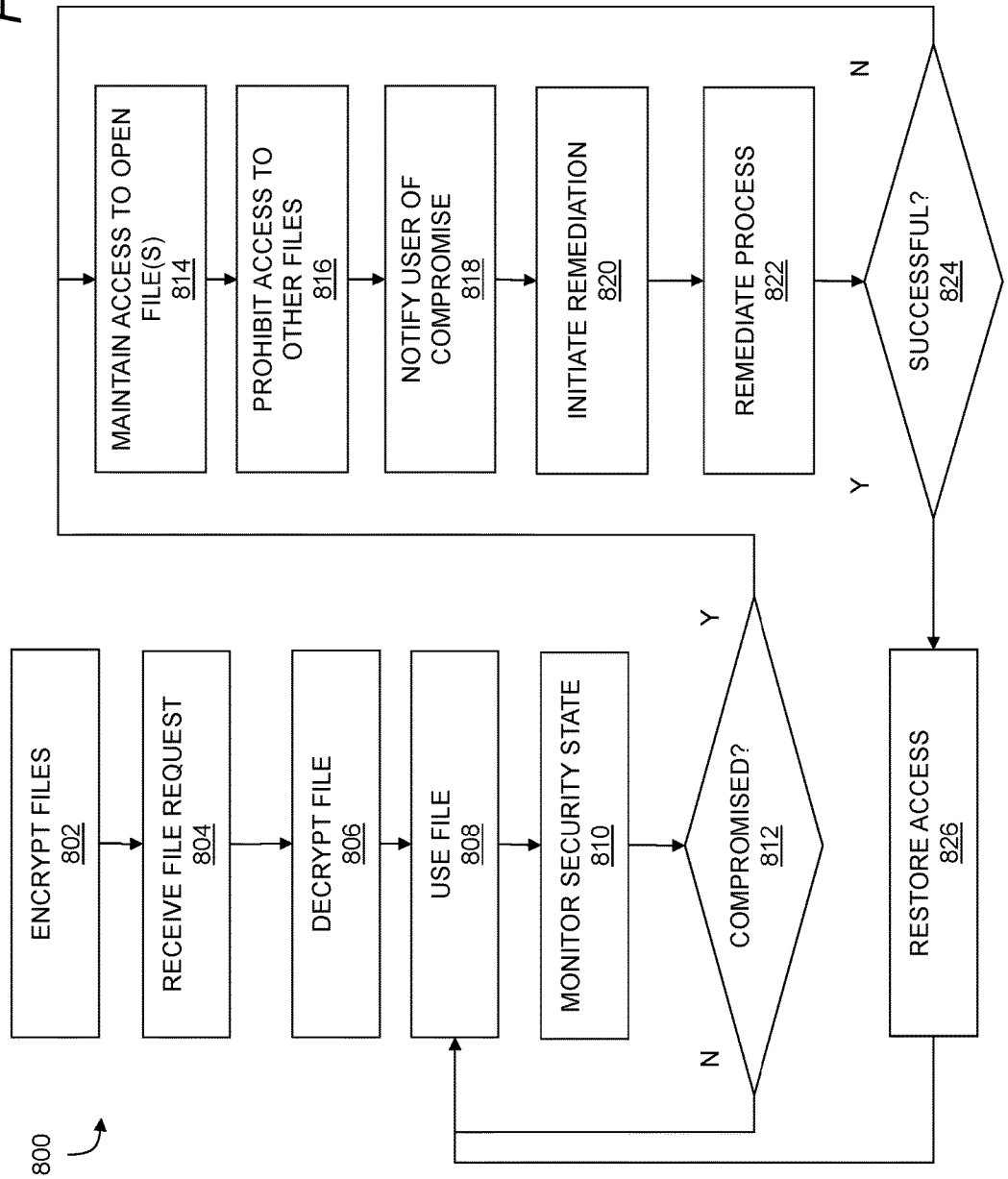
FIG. 8 shows a method for securing an endpoint.

FIG. 8 shows a method for securing an endpoint. In general, all of the files within the file system may be encrypted to place them in a protected state, and then a file system extension such as any of the extensions described above may be used to conditionally grant access by processes to the encrypted files.

As shown in step 802, the method 800 may begin with encrypting a plurality of files on an endpoint to prevent unauthorized access to the plurality of files. This may, for example, include encrypting files using an extension to a file system such as a file system filter, mount point, or other suitable extension to an interface between a user environment for executing processes and a files stored in memory on the endpoint. Encryption may be performed for all content on the endpoint when the endpoint is created or initialized, or when the file system extension is added an operating system for the endpoint, or at some other useful or convenient time. In one aspect, encryption may be performed as a background process over an extended period of time so that the endpoint can remain in use during an initial encryption process. In another aspect, encryption may be performed when files are accessed for the first time, or the initial encryption may be scheduled for a time when the endpoint is not typically in use, e.g., early hours of the morning.

As shown in step 804, the method 800 may include receiving a request to access one of the files from a process executing on the endpoint. In general, this includes receiving an access request at a file system, or at a file system filter or mount point for the file system, or any other extension to file system described herein. With files encrypted as described above, the file system may operate in an ordinary fashion and transparently to the process (or a computing environment for the process) to provide file access functions such as opening, closing, creating, deleting, reading, writing, and so forth, while managing encryption and decryption through the file system extension. The file access function may include an access request as generally contemplated by step 804, which may initially include a request to open or create a file, and may subsequently include read or write operations or other conventional file functions.

As shown in step 806, the method 800 may include decrypting the one of the files for the process. In general, this may be performed transparently by the file system. That is, the process(es) accessing files that are managed by the file system do not need any cryptographic information or other programming overhead. Rather, they simply initiate requests to the file system in a conventional manner, and the file system applies an extension such as any of those described above to manage cryptographic access to files stored by the file system subject to any of the conditions contemplated herein (e.g., an appropriate security state or exposure state). The file system extension may in turn conditionally provide encryption and decryption functions based on a current security state of the process. In general, all of the files managed by the file system may be encrypted, and decrypting a file may include accessing a cryptographic key for the files using a file system filter, mount point, or other file system extension and applying the cryptographic key to decrypt the one of the files.

In one aspect, the file system extension (e.g., file system filter or mount point) may be configured to respond to an indication of a severe compromise (e.g., the entire endpoint, multiple processes, or a known, severe threat) by deleting key material stored on the endpoint to prevent all access to files within the file system. Any suitable key recovery techniques may be used to recover the deleted key material once a compromise has been fully resolved. Key recovery may include local key recovery techniques, remote key recovery techniques, or some combination of these. This provides a technique for completely disabling or protecting an endpoint against further data leakage or damage when a severe compromise is detected.

As shown in step 808, the method 800 may include using the file that has been accessed, such as by reading data from the file, writing data to the file, closing the file, saving the file, and so forth.

As shown in step 810, the method 800 may include monitoring a security state of the process that accessed the file. In general, monitoring may be performed by code within the file system extension, or monitoring may be performed by one or more local or remote processes for monitoring reputation, integrity, health, security and the like, any or all of which may communicate with the file system extension to provide updates on a security state of the process or an endpoint executing the process. Monitoring may employ any of the techniques contemplated herein. By way of non-limiting examples, this may include behavior analysis such as detecting a compromised state of the process based on a behavior of the process, a behavior of an associated process, and a behavior of the endpoint. This may also or instead include static analysis such as locally monitoring the process with a file scanner that performs static analysis on related files such as a file (or files) that the process launches from, or a file (or files) that get loaded into the process during execution.

More generally, monitoring the security state of the process may include monitoring observable behaviors for the process. This may include a pattern of file behavior by the process such as reading, writing, creating, deleting, and combinations of the foregoing. This may also or instead include persistence behavior such as writing to a registry or other locations that contain code used at startup to initialize an endpoint by the process (e.g., writing to a registry). In another aspect, this may include inter-process communications such as communications between processes and other process-related actions such as creation of a new process, thread injection, memory injection, and so forth. In another aspect, this may include direct detection of exploits based on specific behaviors, or detection of files loaded into the process that may contain harmful features such as shared dynamic linked libraries, user data files, templates, macros, and so forth.

Monitoring the security state may also or instead include monitoring network behavior such as network traffic associated with the process. For network traffic, coloring techniques such as those described above may be used to label network traffic to facilitate identification and tracking. For example, monitoring the security state of the process may include adding an application identifier to the network traffic originating from the process, wherein the application identifier explicitly identifies an application associated with the process and monitoring network traffic from the process at a gateway between the endpoint and a data network based on the application identifier. The endpoint may also log relevant information to facilitate such monitoring. For example, monitoring may include generating a log of network requests by logging network requests and applications making the network requests. With network behavior locally logged in this manner, monitoring the security state may further include storing an application identifier in the log of network requests, where the application identifier explicitly identifies an application associated with a source process for a network request, and monitoring network requests from the application at a gateway between the endpoint and a data network based on the application identifier.

As shown in step 812, the security state may be evaluated to determine whether the security state has become a compromised state. This evaluation may occur periodically on some fixed or variable schedule, or in response to other events, or the evaluation may be performed by an external software component that pushes notifications to the file system extension when exposures are detected. If the security state is 'not compromised' (a 'no' to the compromised inquiry) then the endpoint point may continue to operate in the ordinary fashion and the method 800 may return to step 808 where the open file is used. If the security state is a compromised state (a 'yes' to the compromised inquiry), then the method 800 may proceed to step 814 where additional action can be taken.

As shown in step 814, while the executing process is in the compromised state, the method 800 may include maintaining access to any open ones of the plurality of files including the file requested in step 804. In general, access may be maintained by continuing to provide encryption/decryption for the open files through a file system extension as described above, or using any other analogous technique. In this manner, the process may continue to execute, preventing a catastrophic or inconvenient termination of an application or the like for the user. The user may continue to use a file, save the file, or otherwise continue with a process in any suitable manner. This may expose some encrypted files within the file system to potentially harmful processes. However, an inference can be made that by the time a compromise is detected, the open files have already been potentially affected. At this point, the remediation strategy can shift to preventing a further spread of harmful impact to other files and data on the endpoint while minimizing impact to the current user.

As shown in step 816 the method 800 may include including prohibiting access to other ones of the plurality of files. In general, access may be prohibited by withholding encryption/decryption functions for the other files through a file system extension as described above, or using any other analogous technique. Prohibiting access may include prohibiting access to all other files managed by the file system, or permitting access to some files while prohibiting access to a subset of files that are identified as protected, confidential, or otherwise labeled for heightened protection. In this manner, when a compromise is detected, the compromised process may continue to execute while being isolated from other files that the process has not yet touched.

As shown in step 818, the method 800 may include providing a notification to a user in a display of the endpoint. The notification may indicate a required remediation step for the process to resolve the compromised state, and the notification may inform the user that an application associated with the process cannot access additional files until the user completes the required remediation step. For example, the notification may include a pop-up window or the like with text stating: "Process X is compromised. You must close all files and restart this process before accessing other content with Process X." The notification may include a number of buttons or the like such as "okay", "remediate now," "remediate later," and so forth.

As shown in step 820, the method 800 may include initiating a remediation of the process. In one aspect, this may include facilitating a restart of the process, such as in response to a user input received from the notification described above.

As shown in step 822, the method 800 may include remediating the compromise. Where the compromise is dynamic in nature, e.g., based on code loaded into an executing process, a restart of the process may be sufficient to fully remediate the compromised state. However, additional remediation steps may be required including registry repair, removal or reinstallation of an application, deletion of files or other clean up and remediation. A variety of tools are known in the art and may be usefully deployed to attempt remediation based upon the nature of the compromised state.

As shown in step 824, the remediation may be evaluated for success. If the remediation is successful, the method 800 may proceed to step 826 where access is restored by the process to the plurality of files managed by the file system. The process may then return to step 808 where files are used in the ordinary manner and encryption and decryption services are transparently provided to the process by the file system extension. If the remediation is unsuccessful, then the process may return to step 814 where the process can continue to access open files but no other files. In this latter case of unsuccessful remediation, additional steps may be taken, such as quarantining an endpoint, permanently disabling the process, or otherwise applying heightened restrictions to the endpoint or the process.

An endpoint such as any of the endpoints described above may be configured according to the foregoing method 800 to provide endpoint security. Thus in one aspect, a system disclosed herein includes an endpoint with a first memory storing a plurality of files that are managed by a file system and encrypted to prevent unauthorized access, as well as a second memory that stores key material for decrypting the plurality of files. The first memory and the second memory may be separate physical memories such as a non-volatile disk-based memory storing the plurality of files and a volatile random access memory storing the key material. The endpoint may include a processor and a process executing on the processor. A file system executing on the processor may be configured to manage access to the plurality of files by the process, and may be further configured to respond to a request from the process for one of the files by conditionally decrypting the one of the files based on a security state of the process. As described above, the file system may conditionally decrypt files using an extension to an operating system of the endpoint such as a file system filter, mount point, or other extension.

The system may include a gateway such as any of the gateways described above. The gateway may be coupled in a communicating relationship with the endpoint and configured to monitor the security state of the process based on network traffic or other behavioral observations for the process. The system may also or instead include a threat management facility such as any of the threat management facilities described above coupled in a communicating relationship with the endpoint and configured to remotely monitor the security state of the process based on indications of compromise received from the endpoint.

Figure 9:
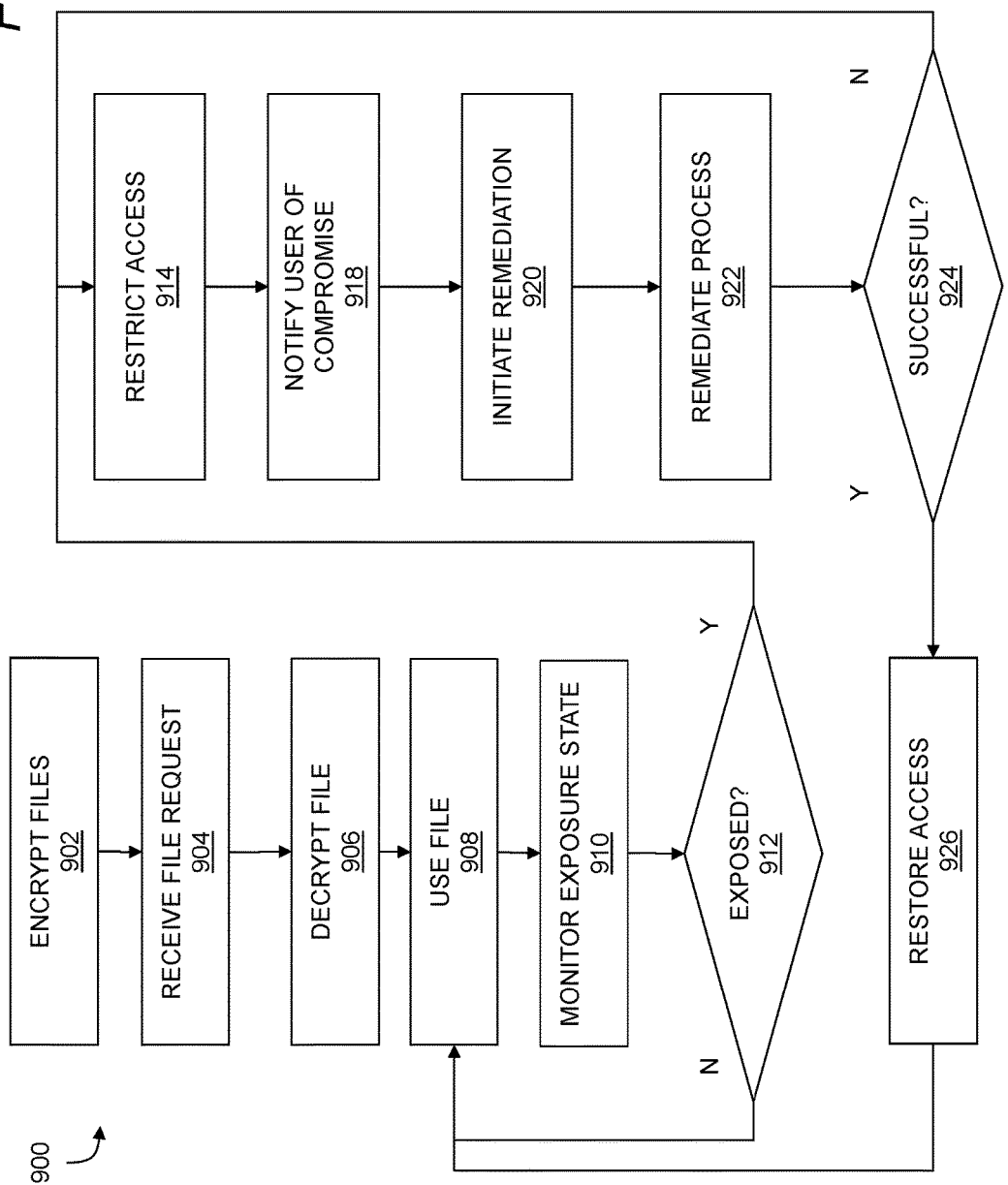
FIG. 9 shows a method for securing an endpoint.

FIG. 9 shows a method for securing an endpoint. In general, the method 900 may operate in a similar manner to the method described above, with a notable exception that the overall method 900 monitors exposure of a process to potentially unsafe content rather than detecting compromised states. It will be appreciated that the method 900 of FIG. 9 may be used instead of or in addition to the method 800 of FIG. 8. That is the two methods may be applied sequentially or in parallel, or some combination of these, by incorporating suitable code/logic into a file system extension that controls access to a cryptographically secured file system.

As shown in step 902, the method 900 may begin with encrypting a plurality of files on an endpoint to prevent unauthorized access to the plurality of files. This may, for example, include encrypting files using an extension to a file system such as a file system filter, mount point, or other suitable extension to an interface between a user environment for executing processes and a files stored in memory on the endpoint. Encryption may be performed for all content on the endpoint when the endpoint is created or initialized, or when the file system extension is added an operating system for the endpoint, or at some other useful or convenient time. In one aspect, encryption may be performed as a background process over an extended period of time so that the endpoint can remain in use during an initial encryption process. In another aspect, encryption may be performed when files are accessed for the first time, or the initial encryption may be scheduled for a time when the endpoint is not typically in use, e.g., early hours of the morning.

As shown in step 904, the method 900 may include receiving a request to access one of the files from a process executing on the endpoint. In general, this includes receiving an access request at a file system, or at a file system filter or mount point for the file system, or any other extension to file system described herein. With files encrypted as described above, the file system may operate in an ordinary fashion and transparently to the process (or a computing environment for the process) to provide file access functions such as opening, closing, creating, deleting, reading, writing, and so forth, while managing encryption and decryption through the file system extension. The file access function may include an access request as generally contemplated by step 804, which may initially include a request to open or create a file, and may subsequently include read or write operations or other conventional file functions.

As shown in step 906, the method 900 may include decrypting the one of the files for the process. In general, this may be performed transparently by the file system. That is, the process(es) accessing files that are managed by the file system do not need any cryptographic information or other programming overhead. Rather, they simply initiate requests to the file system in a conventional manner, and the file system applies an extension such as any of those described above to manage cryptographic access to files stored by the file system subject to any of the conditions contemplated herein (e.g., an appropriate security state or exposure state). The file system extension may in turn conditionally provide encryption and decryption functions based on a current security state of the process. In general, all of the files managed by the file system may be encrypted, and decrypting a file may include accessing a cryptographic key for the files using a file system filter, mount point, or other file system extension and applying the cryptographic key to decrypt the one of the files.

In one aspect, the file system extension (e.g., file system filter or mount point) may be configured to respond to an indication of a compromise, or an indication of a severe compromise (e.g., the entire endpoint, multiple processes, or a known, severe threat) by deleting a cryptographic key or other key material stored on the endpoint to prevent all access to files within the file system. Any suitable key recovery techniques may be used to recover the deleted key material once a compromise has been fully resolved. Key recovery may include local key recovery techniques, remote key recovery techniques, or some combination of these. This provides a technique for completely disabling or protecting an endpoint against further data leakage or damage when a severe compromise is detected.

As shown in step 908, the method 900 may include using the file that has been accessed, such as by reading data from the file, writing data to the file, closing the file, saving the file, and so forth.

As shown in step 910, the method 900 may include monitoring an exposure state of the process on the endpoint to potentially unsafe content. In general, exposure will have a state of 'exposed' or 'secure' is based on actual or potential exposure of an executing process to potentially unsafe content such as risky network locations, files outside the encrypted file system, and so forth. A variety of rules may be used to detect exposure.

In general, monitoring the exposure state of the process to potentially unsafe content may include applying a plurality of behavioral rules to determine whether the exposure state of the process is either exposed or secure. Under a basic rule set, the process may be initially identified as secure, and then identified as exposed based on contact with content other than the plurality of files securely managed by the file system. In another aspect, a process may be initially categorized as exposed until a source, user, or other aspects of the process are authenticated. In one aspect, exposure may be measured using a simplified rule set wherein (1) the process is initially identified as secure, (2) the process is identified as exposed when the process opens a network connection to a Uniform Resource Locator that is not internal to an enterprise network of the endpoint and that has a reputation that is poor, (3) the process is identified as exposed when the process opens a first file that is identified as exposed, and (4) the process is identified as exposed when another exposed process opens a handle to the process. The reputation of the Uniform Resource Locator may be obtained from a remote threat management facility such as any of the remote threat management facilities described herein, or the reputation may be looked up in a local database or the like. Where exposure of the first file is used as a basis for determining when the process is exposed, exposure of the first file may be determined in a variety of ways. For example, the first file may be labeled or colored as exposed using the techniques described above, based on some prior context or activity for the file. Or the file may be identified as exposed based on a scan of the file for the presence of malware or the like.

Other conditions or rules may also or instead be used to measure when a process is exposed to potentially unsafe content. For example, the method 900 may include identifying the first file as exposed when at least one of the following conditions is met: (1) the first file is not one of the plurality of files; (2) the first file is saved by a second process that is identified as exposed; and (3) a source of the first file has a low reputation.

As shown in step 912, the process may be evaluated for exposure to potentially unsafe content. This evaluation may occur periodically on some fixed or variable schedule, or in response to other events, or the evaluation may be performed by an external software component that pushes notifications to the file system extension when exposures are detected. When the process is not exposed (i.e., the exposure state is 'secure'), the process may return to step 908 and continue to use files within the file system. When the process is exposed, then the method 900 proceeds to step 914.

As shown in step 914, when the process is exposed the method 900 may include restricting access by the process to the files managed by the file system, more specifically by controlling access to the files through a file system filter or other extension to the file system that conditionally decrypts one or more of the plurality of files for the process according to the exposure state of the process. In this context, restricting access by the process to the files may include maintaining access to any of the plurality of files that have been opened by the process before the process became exposed, and preventing access to other ones of the plurality of files, all as generally described above by way of example in the method 800 of FIG. 8.

As shown in step 918, the method 800 may include providing a notification to a user in a display of the endpoint. The notification may indicate a required remediation step for the process to resolve the exposed state, and the notification may inform the user that an application associated with the process cannot access additional files until the user completes the required remediation step. For example, the notification may include a pop-up window or the like with text stating: "Process X is exposed to potentially unsafe content. You must close all files and restart this process before accessing other content with Process X." The notification may include a number of buttons or the like such as "okay", "remediate now," "remediate later," and so forth.

As shown in step 920, the method 800 may include initiating a remediation of the process. In one aspect, this may include facilitating a restart of the process, such as in response to a user input received from the notification described above, or automatically in the absence of user input.

As shown in step 922, the method 800 may include remediating the exposure. In one aspect, this may include restarting the process. Other steps may include closing or deleting the files that caused the exposure, scanning the endpoint for related content or potential threats, and so forth. The process may also be scanned after a restart to determine whether the exposure has resulted in any instantiation of malware or the like. A variety of other tools are known in the art and may be usefully deployed to attempt remediation based upon the nature of the exposed state.

As shown in step 924, the remediation may be evaluated for success. If the remediation is successful, the method 800 may proceed to step 926 where access is restored for the process to the plurality of files managed by the file system. The process may then return to step 908 where files are used in the ordinary manner and encryption and decryption services are transparently provided to the process by the file system extension. If the remediation is unsuccessful, then the process may return to step 914 where the process can continue to access open files but no other files. In this latter case of unsuccessful remediation, additional steps may be taken, such as quarantining an endpoint, permanently disabling the process, or otherwise applying heightened restrictions to the endpoint or the process.

It will be appreciated that the method for evaluating exposure as described with respect to FIG. 9 may be used exclusively, or may be used concurrently or sequentially with the method for evaluating compromise described with reference to FIG. 8. That is, a method may usefully monitor a security state and an exposure state at the same time, and use either or both of these states to improve endpoint security as contemplated herein. In another aspect, both compromise and exposure may be collectively tracked as two different values to a single security state, with rules applied by the file system extension for file access and remediation according to value. Thus, while monitoring exposure, the method 900 may also include monitoring a security state of the process and restricting access by the process to the plurality of files when the security state is compromised. As described above, monitoring the security state may include monitoring the security state at a threat management facility or locally monitoring the security state with a malware file scanner.

In another aspect an endpoint such as any of the endpoints described above may implement the techniques for exposure monitoring and response as described above. A corresponding system may include an endpoint with a processor and a first memory storing a plurality of files that are encrypted to prevent unauthorized access. A process may be executing on the endpoint, and a file system on the endpoint may be configured to manage access to the plurality of files by the process. The file system may include an extension such as a file system filter or a mount point configured to monitor an exposure state of the process and to restrict access to the one of the files based on the exposure state of the process by conditionally decrypting the one of the files based on the exposure state. The file system may maintain access to any of the files that have been opened by the process before the process became exposed, while preventing access to other ones of the files. The endpoint may include an integrity monitor such as the threat monitor described above configured to evaluate the exposure state by applying a plurality of behavioral rules to determine whether the exposure state of the process is either exposed or secure, wherein the process is initially identified as secure and the process is identified as exposed based on contact with content other than the plurality of files. The endpoint may include a remediation component configured to remediate the process using any of the techniques described herein and return the process from the exposed state to the secure state for unrestricted access to the plurality of files. The remediation component may include any software component, either local to the endpoint or remote from the endpoint, or some combination of these containing code adapted to delete, uninstall, quarantine, isolate, reconfigure, reprogram, monitor or otherwise remediate malicious or potentially malicious code on the endpoint.

The integrity monitor may be further configured to identify the process as exposed according to the plurality of behavioral rules, wherein (1) the process is identified as exposed when the process opens a network connection to a Uniform Resource Locator that is not internal to an enterprise network of the endpoint and that has a reputation that is poor, (2) the process is identified as exposed when the process opens a first file that is identified as exposed, and (3) the process is identified as exposed when another exposed process opens a handle to the process.

Figure 10:
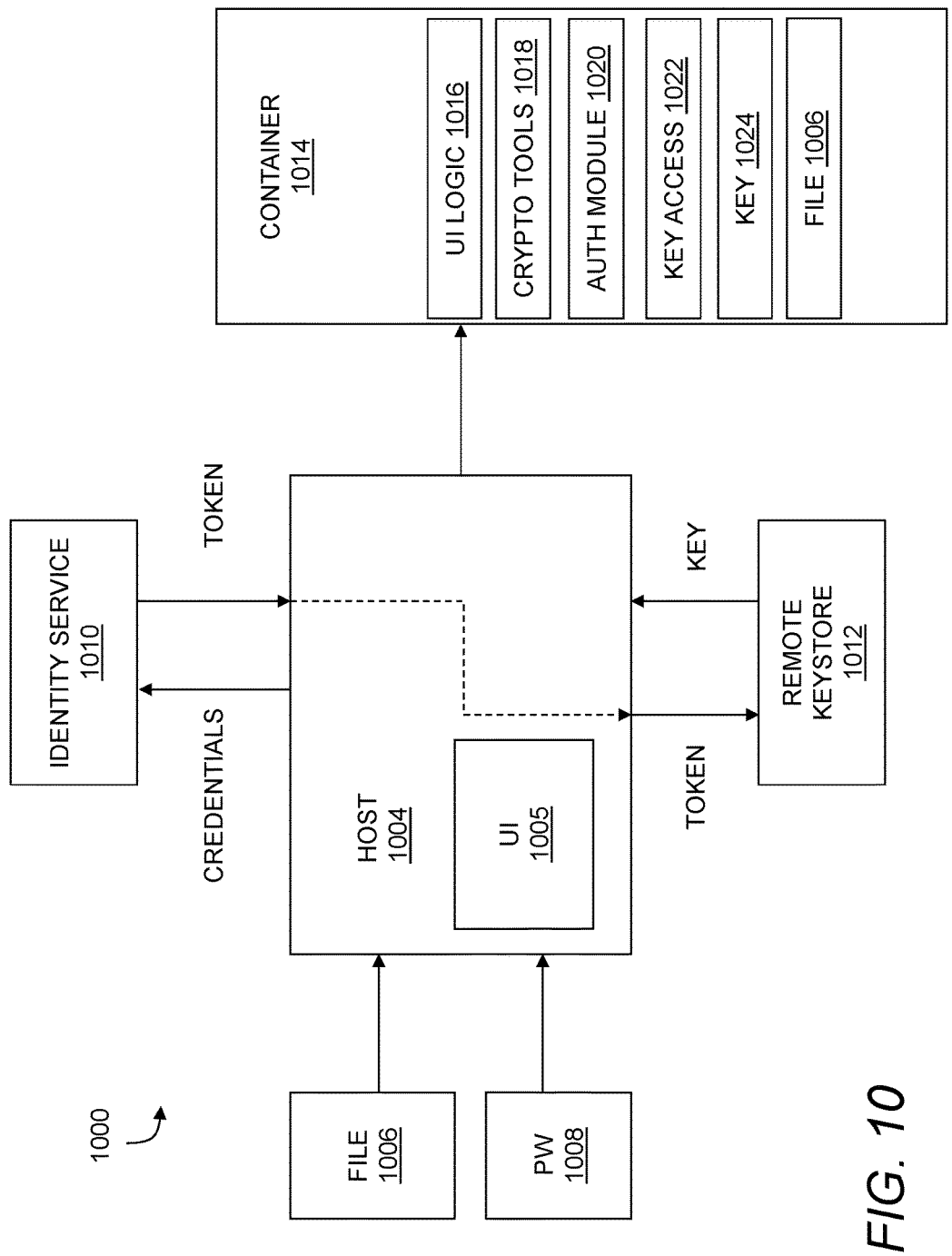
FIG. 10 shows a system for creating portable encrypted content.

FIG. 10 shows a system for creating portable encrypted content. In general, the system may include a host 1004 such as client or any of the other computing devices described above that can be operated by a user to perform various computing tasks. In a user interface 1005 presented on a display by the host 1004, the user may select a file 1006 that the user wishes to send to a recipient or otherwise share. The file 1006 may be a file locally stored on the host 1004 or a file selected from a remote location such as a web folder, remote data storage facility, or other remote resource. The file may include any of the file types described herein, as well as multiple file types bundled into a zipped folder or other container with a multi-file payload. In another aspect, the user may select multiple files at one time (and optionally from multiple locations) for inclusion in a single portable encrypted object. A user may also supply a password in the user interface that can be used as described below to locally unwrap the file from a container 1014 for portable encrypted content without access to a remote key server or other remote resources.

The host 1004 may provide credentials to an identity service 1010 in order to receive a token that can be associated with one or more recipients who can also authenticate to the identity service 1010. For each intended recipient, the identity service 1010 may supply an authentication token uniquely identifying the recipient. The token may, for example, be signed or otherwise cryptographically protected in any matter suitable for creating or maintaining desired trust relationships among the sender, recipient, and a remote key server. The identity service 1010 may, for example, include a dedicated identity service such as the AWS Identity and Access Management platform. Other platforms such as social networking platforms and the like may also or instead be used to provide unique tokens for users based on authentication credentials. In another aspect, the token may be supplied by a host operating system such as Windows, which can provide an authentication token to a user authenticated to the Windows Active Directory.

In one aspect, multiple identity services 1010 may be used. So, for example, where the sender and the recipient are associated with different organizations or entities, a (cryptographic) trust relationship between these entities may be used to support trans-entity communications using portable objects as contemplated herein. While numerous techniques may be used to implement this type of system, such as by hosting both entities at the same identity service, or by providing a way for members of one entity to use (or at least select from an identity list of) another entity, they will generally share the property of either automatically identifying a permitted recipient from a different entity, or permitting the sender to select a recipient from a list of identities that include users not directly associated with the senders host organization. All such variations that would be apparent to one of ordinary skill in the art may be used to support cross-organizational secure communication of data and files as contemplated herein.

In another aspect, outbound communications may be examined so that any attachments addressed to other organizations or domains that have a pre-established cryptographic trust relationship with the sender domain can be automatically encrypted using the techniques described herein. This may, for example, include identifying the recipient domain, retrieving an identity token from an identity service for the recipient at the recipient domain, and then creating a portable encrypted object as otherwise described herein. In one aspect, the password for local decryption may be automatically selected by a gateway or other intermediate network element that is monitoring outbound communications. In another aspect, the sender may be prompted to provide a password.

The host 1004 may then present this token to a remote keystore 1012 along with any other suitable identifying information for the sender and/or recipient, along with any digital signatures, hashes or the like. The remote keystore 1012 may be any suitable remote key server that can be operated to receive tokens, associate keys with the tokens, and return the keys to the host 1004.

With this information, the file 1006 may be wrapped and distributed as portable encrypted content. The container 1014 may include a number of software components. This may, for example, include user interface logic 1016 operable to provide a user interface on a receiving machine as necessary for a recipient to unwrap the file 1006 from the container 1014. For example, the user interface logic 1016 may include tools for various types of key retrieval, e.g., by retrieving a token from the identity service 1010 and transmitting this to the remote keystore 1012, or by directly presenting suitable credentials to the remote keystore 1012 to recover the key, or by receiving a password in a local user interface and using the password to recover the key 1024 that is encrypted and wrapped in the container 1014. Cryptographic tools 1018 may also be included in the container 1014 so that no additional cryptographic libraries are required on a recipient machine.

An authentication module 1020 may also be encoded into the container 1014 to control various authentication processes contemplated herein. In general, the authentication module 1020 is operable to authenticate a user, such as the recipient of the container 1014, to the remote keystore 1012. This may include retrieving an authentication token from the identity service 1010, obtaining the authentication token from a local operating system (e.g., from Active Directory) or, if an authentication token is already present on the recipient machine, using this token to retrieve the key from the remote keystore 1012. The user interface logic 1016 may also support direct retrieval of the key from the remote keystore 1012 through direct entry of valid keystore credentials such as a username and password.

The file 1006 may be encrypted using the key 1024 (or an encryption key from an asymmetric key pair), and as noted above, the key 1024 itself (or the decryption key from an asymmetric key pair) may be encrypted and wrapped into the container 1014 for local recovery of a file by anyone with the appropriate password 1008. Thus, the password may be received by the host 1004 from a user and used to encrypt the key 1024 that was received from the remote keystore 1012. This encrypted instance of the key 1024 may be safely included in the container 1014 in this encrypted form without compromising security of the container 1014, while providing a file recovery mechanism even if other access information (e.g. the authentication token or identity service 1010 credentials) has been lost or changed.

Figure 11:
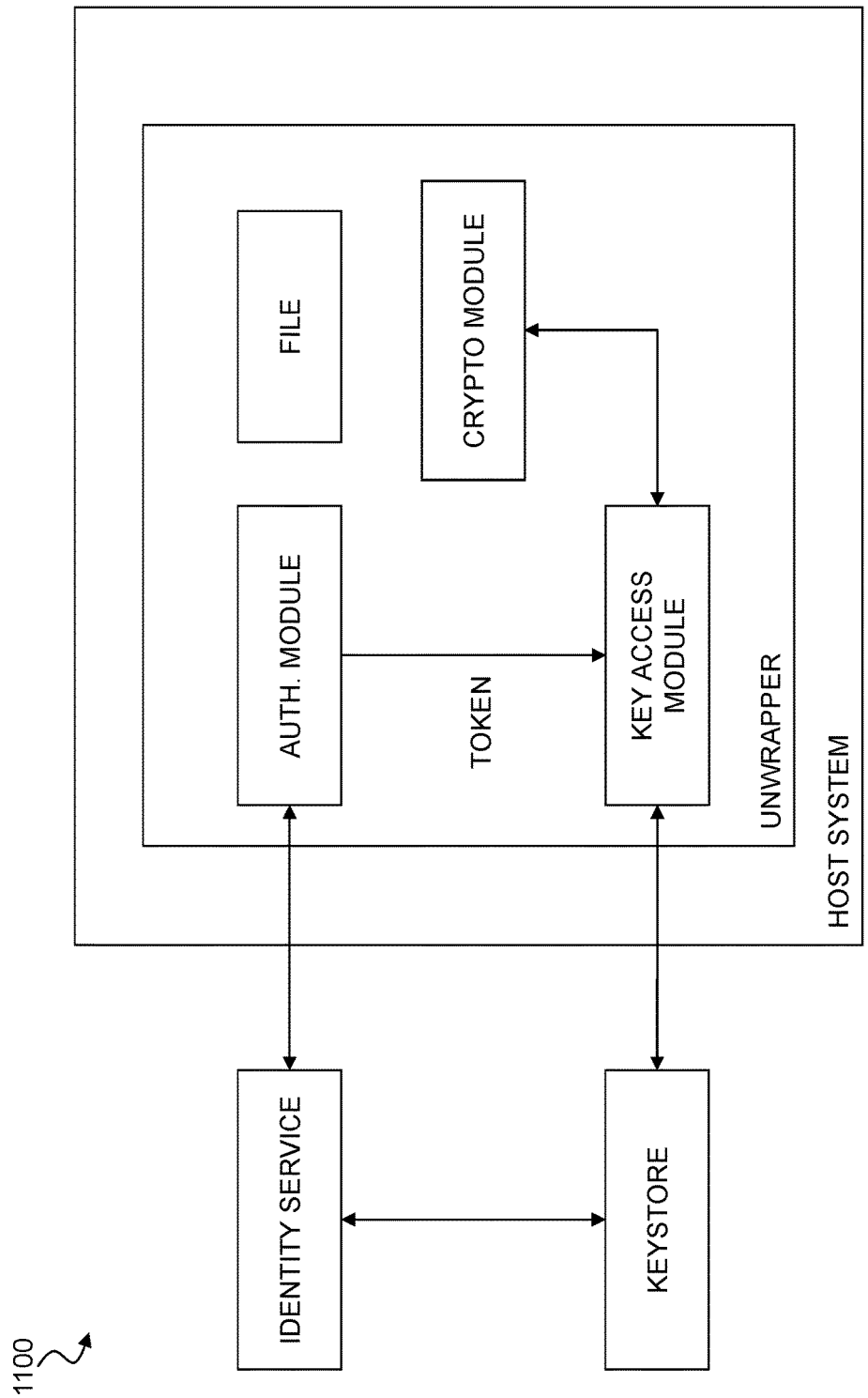
FIG. 11 illustrates a process for unwrapping portable encrypted content.

FIG. 11 illustrates a process 1100 for unwrapping portable encrypted content. In this embodiment, federated authentication is applied in which the container (labeled as an "unwrapper" in this figure) authenticates to the identity service, which can then transparently retrieve the token and present this token to the keystore to receive the key for decrypting a contained file with the cryptographic module without any explicit user interaction beyond selecting the contained file for use.

Figure 12:
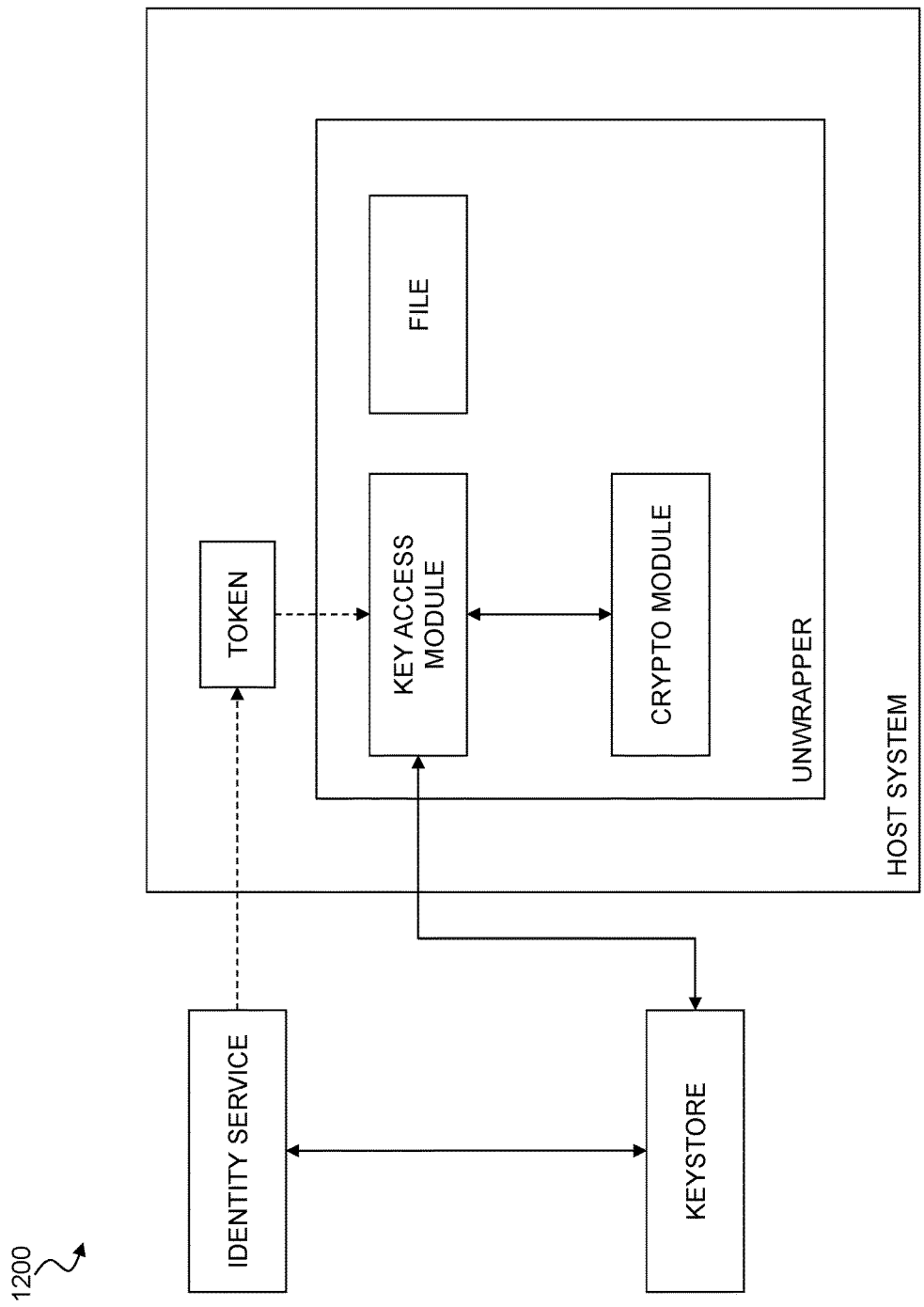
FIG. 12 illustrates a process for unwrapping portable encrypted content.

FIG. 12 illustrates a process 1200 for unwrapping portable encrypted content. In this embodiment, the host system has already authenticated to the identity service, so the token is present on the host system. In this case, the authentication module does not need to authenticate to the identity service, and the key access module can directly access the keystore with the token to retrieve the key, again without any explicit user interaction beyond selecting the contained file for use.

Figure 13:
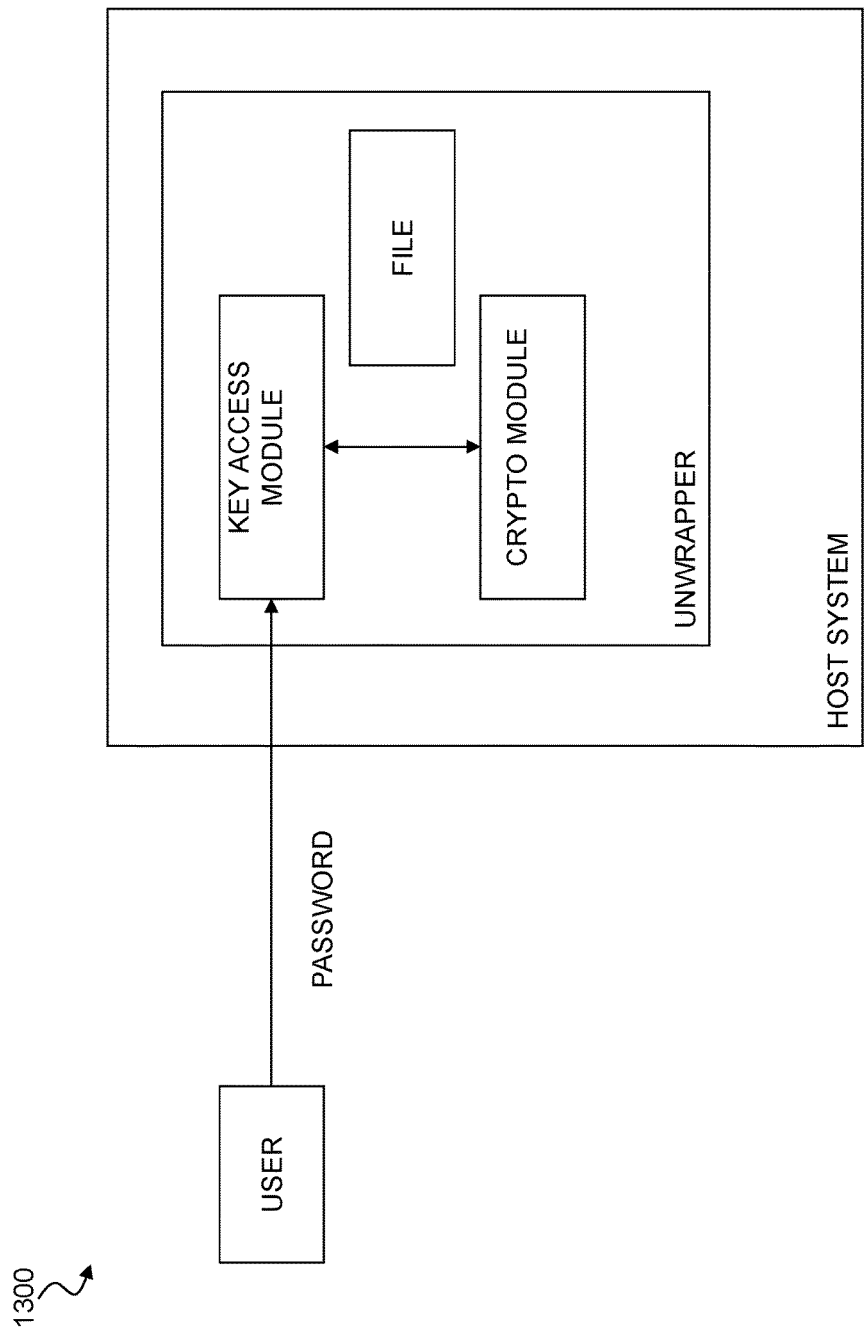
FIG. 13 illustrates a process for unwrapping portable encrypted content.

FIG. 13 illustrates a process 1300 for unwrapping portable encrypted content. In this case, a user directly provides the password for accessing the file. The password can be used to decrypt the copy of the decryption key wrapped in the container without access to remote resources such as a remote keystore or a remote identity service.

Figure 14:
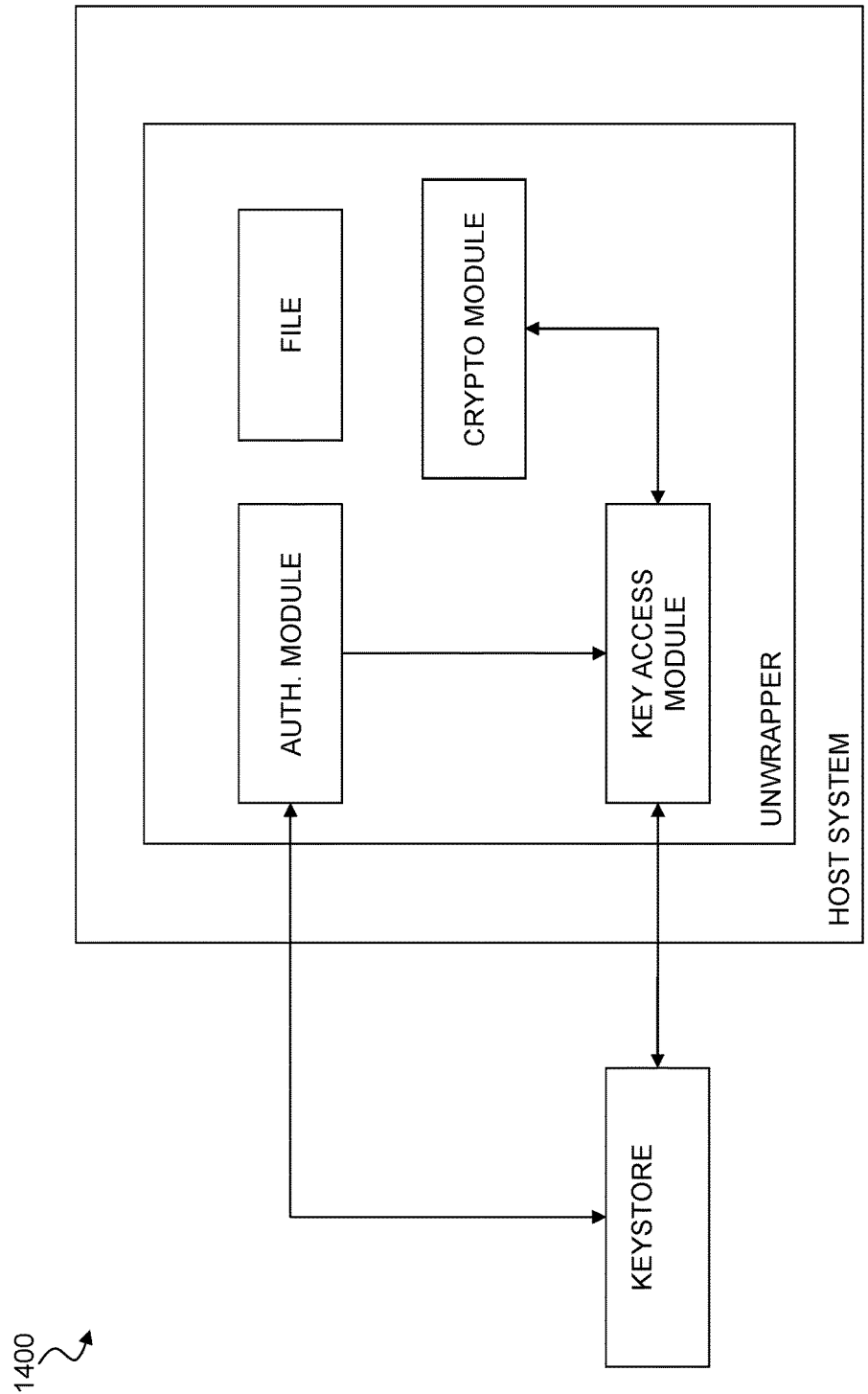
FIG. 14 illustrates a process for unwrapping portable encrypted content.

FIG. 14 illustrates a process 1400 for unwrapping portable encrypted content. As depicted in FIG. 14, the container can receive credentials such as a username and password for directly accessing the remote keystore, e.g., in a user interface presented to a recipient of the container on the host system, and these credentials can be used to recover the key from the remote keystore. In general, the user interface may prompt a user for this input. More generally, the user interface may be presented when the contents of the container cannot be accessed transparently, and may present one or more options to the user for accessing the contents using the various techniques above. For example, the user interface may presented a number of buttons or other selection options for, e.g., password access, remote keystore credentials, identity service credentials, and so forth.

Figure 15:
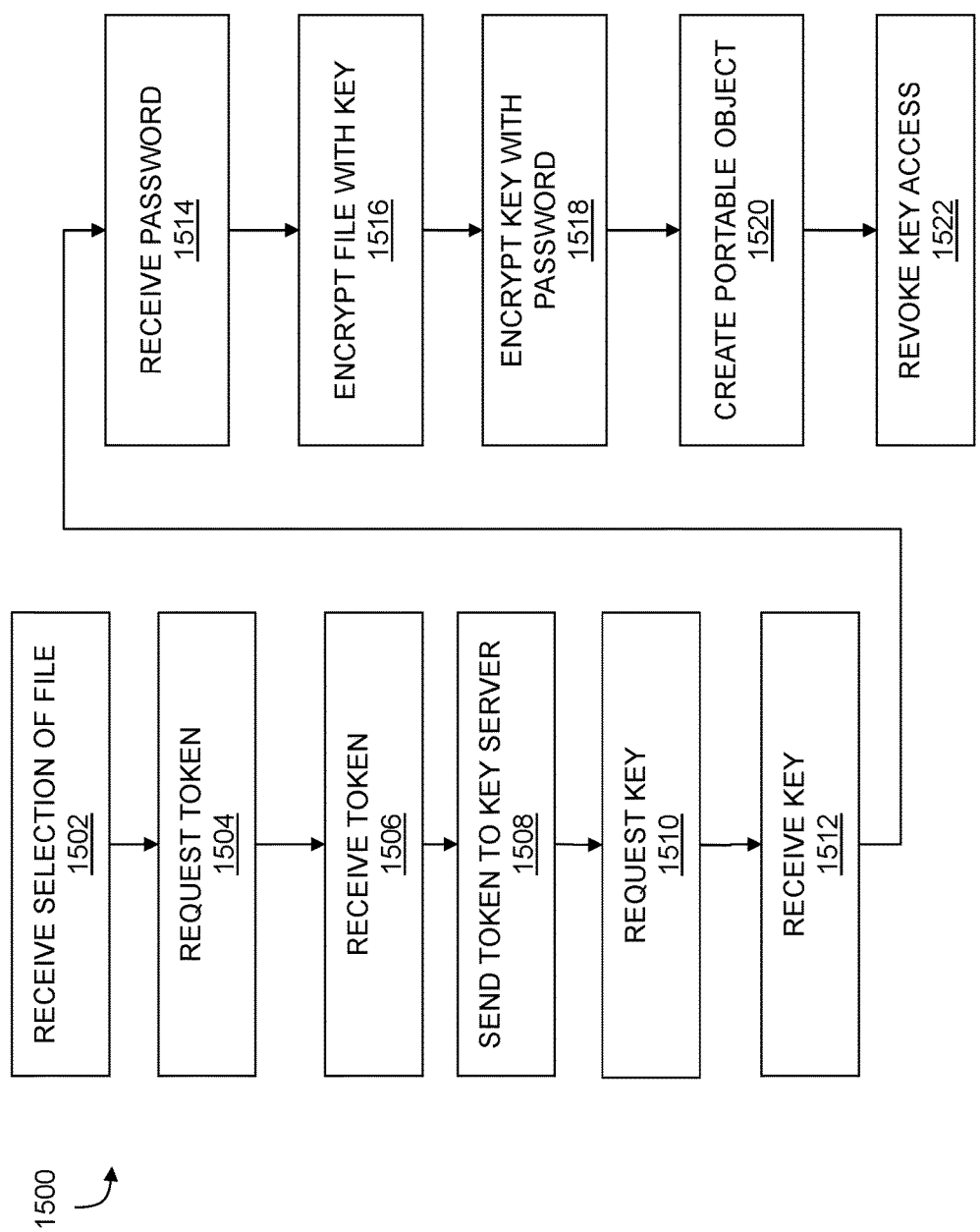
FIG. 15 shows a flowchart of a process for creating portable encrypted content.

FIG. 15 shows a flowchart of a process 1500 for creating portable encrypted content.

As shown in step 1502, the method 1500 may begin with receiving a selection of a file for encryption from a user. This may include a selection from a local directory, a web directory, a remote file store, a file management system, and so forth. This may include a manual step within a user interface of specifying a file for encryption as described herein, or this may include automatic encryption for any file that is outbound from an endpoint, e.g., via electronic mail, text message, ftp file transfer, upload to a remote location, and so forth. In another aspect, the creation of a container with the encrypted file may occur automatically under predetermined conditions, such as when a file is selected from specific directories or when a file is of a certain type, size, date, author, origin, and so forth. Thus the creation of containers for content leaving an endpoint may be automatic, manual, or some combination of these.

As shown in step 1504, the method 1500 may include requesting a token for the file. This may, for example include an authentication token from a first computing environment to which the recipient can authenticate using authentication credentials. The token may uniquely identifying a recipient of the file, or a group of authorized recipients, or some other group, entity, or combination of the foregoing. The token may be digitally signed or otherwise cryptographically processed in a manner that permits verification of origin. In one aspect, the computing environment may include an endpoint, e.g., where an authentication token is obtained from Active Directory or some other operating system service or other local resource or the like. In another aspect, the computing environment may include a remote identity and access management system such as the AWS Identity and Access Management system or a social networking platform configured to support authentication tokens as contemplated herein.

As shown in step 1506, the method 1500 may include receiving the token from the first computing environment. In general, the token may be uniquely associated with an authenticated entity such as an intended recipient of the container so that the intended recipient can subsequently retrieve the token and use this to obtain a decryption key for the container or "wrapper."

As shown in step 1508, the method 1500 may include transmitting the token to the remote key server. This may include transmitting other information necessary or helpful for verifying the identity of the token sender. The remote key server may associate the token with an intended recipient of the file so that, when the token is presented to the key server, the key server can in turn provide the corresponding decryption key.

As shown in step 1510, the method 1500 may include requesting a cryptographic key associated with the token from the remote key server. The cryptographic key may include a symmetric key, or an asymmetric key pair containing an encryption key and a decryption key. As used herein, the terms encryption key and decryption key are intended to refer to either the same key (e.g., where the keys are symmetric) or different keys (e.g., where the keys are asymmetric) unless a more specific meaning is explicitly provided or otherwise clear from the context. The request may include any suitable configuration or parameterization information that might be required by the remote key server, such as information to negotiate or select security protocols, information specifying strength of encryption, the destination path or file name for key material, connection information or requirements, and so forth.

As shown in step 1512, the method 1500 may include receiving the cryptographic key from the remote key server. This may include receiving the cryptographic key through a secure connection, or this may include other steps to secure the key. As noted above, the cryptographic key may be a symmetric key so that the encryption key and the decryption key are the same key, or the cryptographic key may be an asymmetric key pair including an encryption key for encrypting data that is different from a decryption key for decrypting any data encrypted with the encryption key.

As shown in step 1514, the method 1500 may include receiving a password from the user for local decryption of a file or files in the container. Where a user manually selects files for wrapping, a user interface on the host may present a window or dialogue box for the user to input a password that can subsequently be used to decrypt the file from the container. Where files are automatically wrapped as described above, a default password may be used, or a password may be automatically created on a per-file basis (or some other basis, e.g., per-day, per-recipient, etc.) and communicated to the sender through some alternative, secure medium, e.g. through an instant message, a separate electronic mail, a voice message, or the like.

As shown in step 1516, the method 1500 may include encrypting the file with the encryption key to create an encrypted file.

As shown in step 1518, the method 1500 may include encrypting the decryption key to create an object that can be decrypted using the password to recover the decryption key. Thus the decryption key for decrypting the file from the container can be wrapped into the container in order to provide a backup method for extracting the file in the absence of authentication.

As shown in step 1520, the method 1500 may include combining the encrypted file, the object containing the decryption key, and application logic providing a user interface for accessing the file into a portable encrypted data object such as any of the containers described above. Other application logic such as cryptographic libraries, use interface features, and so forth may be usefully incorporated into this object to enhance functionality and ease of use. The user interface may generally provide a number of different modes for accessing the file such as those described above. For example, the user interface may provide a first mode of accessing the file by supplying the password to locally decrypt the decryption key and a second mode of accessing the file by retrieving the decryption key from the remote key server.

The user interface may incorporate programming logic for the various other modes of file access and authentication. For example, the user interface may transparently decrypt the file without user intervention in appropriate circumstances, such as when the recipient has already authenticated to the first computing environment with the authentication credentials. The user interface may also or instead include logic for an authentication module that can remotely retrieve the token from the first computing environment using the authentication credentials and transmit the token to the remote key server to retrieve the decryption key. The user interface may support a further mode of accessing the file by receiving the authentication credentials in the user interface and applying the authentication credentials to retrieve the token. When the recipient is already authenticated to the first computing environment, this may also include transparently decrypting the file for the recipient automatically without explicit user interaction.

The user interface may provide a further mode of accessing the file by providing the decryption key itself through the user interface. That is, the user may obtain the decryption key by other means, and provide this directly to the container through the user interface, or by providing a pointer to a locally accessible instance of the key. The user interface may also or instead provide a mode of accessing the file by providing user credentials to the remote key server. In this embodiment, suitable credentials can be entered by a user through the user interface, and the application logic within the container can access the remote keystore to retrieve any needed key material for decrypting the file.

The portable encrypted data object may use a variety of programming techniques for encapsulating a user interface and cryptography functionality in a relatively universal format. For example, the object may include a hypertext markup language file such as an HTML5 file (HTML5 is the current version of the Hypertext Markup Language (HTML) used for structuring and presenting content on the World Wide Web) containing encryption and decryption logic, user interface program code, and so forth. Where the portable encrypted data object is realized in this form, additional functions and features may be added. For example, a recipient may open and edit the enclosed file—either within the browser context or within a new document based on the extracted file—and then seamlessly add the modified document back into the portable encrypted data object either instead of or in addition to the original file.

As shown in step 1522, the method 1500 may optionally include revoking access to the file. In general, after a container has been distributed, access to the encrypted file within the container can be revoked by notifying the key server to modify or delete an association of the token or the recipient with the decryption key. While this prevents federated access using remote resources, the file will still generally be accessible by using the password to internally recover and apply the decryption key, absent additional steps to modify the container itself. This may be performed through an application running on the sender's endpoint, or through a web interface hosted by the key server. A similar effect may be achieved by removing the token for the recipient from a database of the identity service, although the recipient may still recover the file using a local copy of the token in some circumstances.

In another aspect, the container may include logic to verify access permissions with the remote keystore even when decrypting locally with the password. While somewhat less secure—communications with the keystore may be falsified—this will provide at least one additional layer of protection against access by casual users with access to the password but revoked permissions on the remote keystore.

The method described above may be realized in a host device operated by a user to create and transmit a portable encrypted data object. Thus in one aspect there is disclosed herein an endpoint comprising an interface to a data network, a memory storing a file, and a processor. The processor may be configured, for example with computer executable code, to create a portable encrypted data object containing the file for secure distribution over the data network by performing the steps of receiving a selection of a file for encryption from a user, requesting a token uniquely identifying a recipient of the file from a first computing environment to which the recipient can authenticate using authentication credentials, receiving the token, transmitting the token to a remote key server, requesting an encryption key associated with the token from the remote key server, receiving the encryption key from the remote key server, receiving a password from the user for local decryption of the file, encrypting the file with the encryption key to create an encrypted file, encrypting the encryption key to create an object that can be decrypted using the password to recover the first encryption key, combining the encrypted file, the object containing the encryption key, and application logic providing a user interface for accessing the file into the portable encrypted data object, wherein the user interface provides a first mode of accessing the file by supplying the password to locally decrypt the encryption key and a second mode of accessing the file by retrieving the encryption key from the remote key server.

Figure 16:
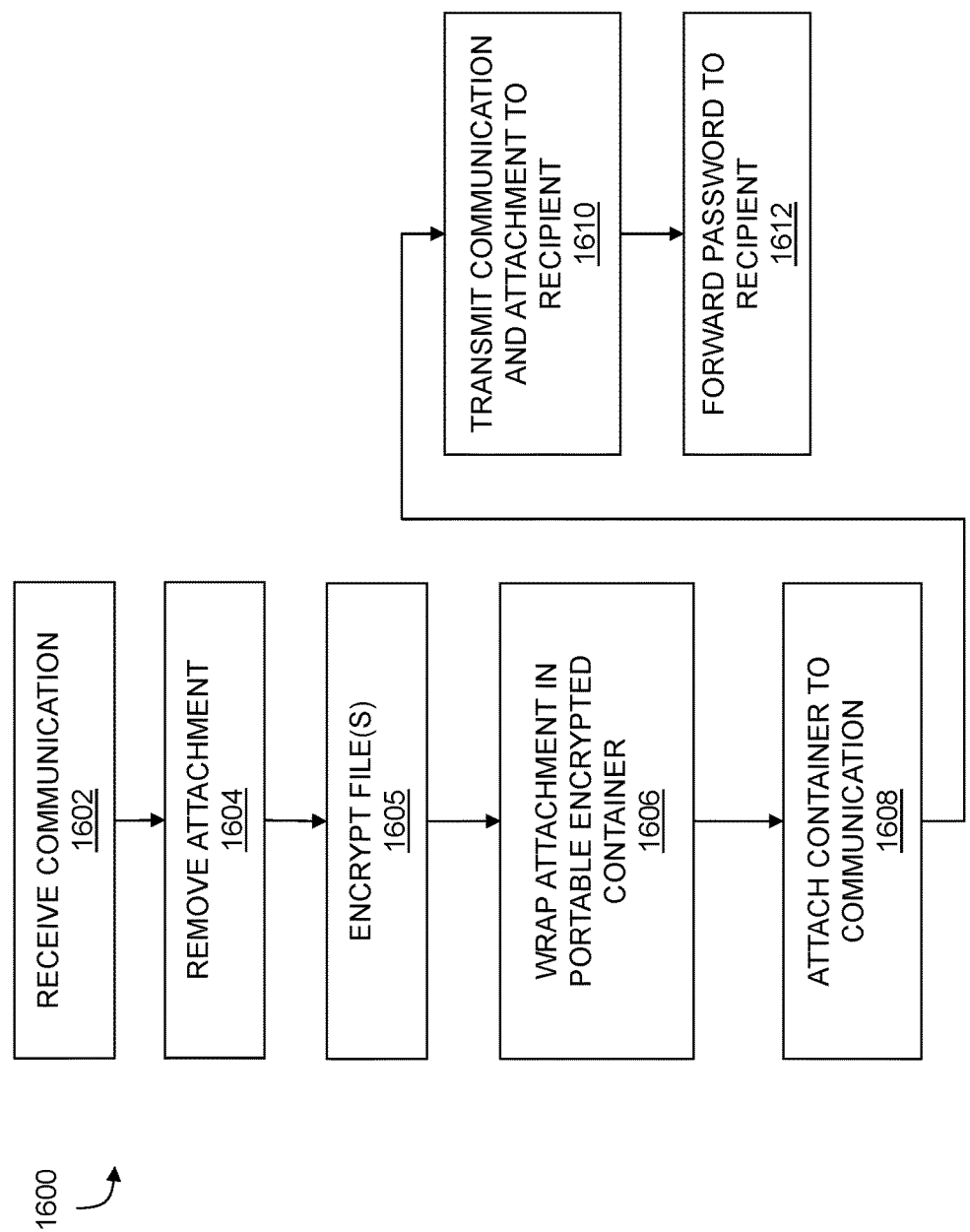
FIG. 16 illustrates a method for enhancing perimeter security for outbound content.

FIG. 16 illustrates a method for enhancing perimeter security for outbound content. In general, the techniques described above for creating portable encrypted containers may be adapted to conditionally (e.g., pursuant to an enterprise security policy) or unconditionally secure outbound files and other content as it leaves an endpoint. In general, this may be performed manually, e.g., with a user providing a password and explicitly approving each outbound file, or automatically, e.g., with a firewall or the like that automatically secures outbound files against unauthorized access. Similarly, the code for detecting outbound files and performing wrapping may be implemented in an electronic mail server, proxy, client or other location for mail communications, or in any other network device or service applicable to outbound communications. For example, Data Leakage Prevention (DLP) tools are commonly used to protect against improper exfiltration of sensitive data, and may be modified to detect and control outbound files as contemplated herein.

As shown in step 1602, the method 1600 may include receiving a communication from a sender for communication to a recipient, the communication including a file coupled to the communication as an attachment. This may, for example include receiving the communication at an endpoint firewall for the sender (e.g., on the client device used by the sender to initiate the communication), at an enterprise gateway or similar gateway or firewall for enterprise communications, or at an electronic mail server used by the sender for outbound electronic mail. This may also or instead include other security devices within a data network configured to monitor traffic and enforce corporate security policies, as well as hosts, gateways and the like for specific communications protocols such as text messaging services and the like.

The communication may, for example, be an electronic mail message or a text message, and the file may be any file or similar computing object such as a word processing document, a spreadsheet, an image, a video, a presentation document, a portable document format document, an application, an executable, a data file, and so forth.

The communication may instead include a file upload to a remote resource such as a social networking platform, a web folder, a file transfer protocol server, a remote file directory, a file drop box, and so forth. Thus it should be appreciated that, as used herein, the term attachment is also intended to include a file contained within packets of an outbound communication such as an ftp file transfer, a file movement to a web directory or drop box, an upload to a remote service, and so forth. While the term attachment might more conventionally be associated with discrete communications protocols such as electronic mail or text messaging, the principles of the invention are intended to apply to any and all outbound communications from an endpoint that might exfiltrate files or similar content, and all such communications may have an "attachment" as that term is used herein. One of ordinary skill in the art may readily adapt the techniques contemplated herein to these and other actions initiated on an endpoint to send a file to a recipient or otherwise communicate the file to locations outside the endpoint.

In still further embodiments, the techniques described herein may be adapted to actions initiated from the endpoint affecting a file transfer between two other remote locations. Thus for example, a user may drag and drop a file from one remote folder to another remote folder to initiate a file transfer for one or more files that are never instantiated on the endpoint. Under these circumstances, the techniques described above may still be usefully applied to ensure that the files placed in the destination folder are wrapped in portable encrypted containers. Similarly, if a user offers remote access by recipients to files stored in a web folder or the like, the files may be wrapped, either before access or as individual files are downloaded, in order to protect against access by unauthorized third parties. These and other variations will be apparent to one of ordinary skill in the art.

As shown in step 1604, the method 1600 may include removing the attachment from the communication.

As shown in step 1604, the method 1500 may include encrypting the file(s) in the attachment, to provide an encrypted instance of the file(s). As described above, this may include securing an encryption key and a corresponding decryption key from a remote key server and using the encryption key to encrypt the file. The remote key server may then associate the decryption key with the recipient (in response to a corresponding request from the sender) so that the decryption key can be retrieved from the remote key server with a presentation of suitable credentials by the recipient.

As shown in step 1606, the method 1600 may include wrapping the attachment into a portable encrypted container. As described above, this container may an object that contains an encrypted instance of the file, an encrypted instance of a decryption key to decrypt the file, and program code providing a user interface for file access. The user interface may support multiple modes for accessing the encrypted content of the container. For example, the user interface may support a first mode of decryption using remote resources (e.g., a remote key server and an identity service). The user interface may also support a second mode of decryption based on local receipt of a password for decrypting the decryption key. In this context, wrapping the attachment may include receiving a user input of the password for local decryption of the file, or wrapping the attachment may include automatically creating the password for local decryption of the file. More generally, any or all of the access modes described above may be incorporated into the user interface code to support access to the contents of the container as desired.

In general, wrapping as contemplated herein may also include applying a security policy such as a policy for exfiltration of files, data and the like. Thus while wrapping may include automatic wrapping of all outbound attachments from the sender, wrapping may instead include conditionally wrapping the attachment according to a security protocol applicable to the sender. The security protocol may temporarily or indefinitely specify automatic wrapping of all outbound attachments from the sender. The security protocol may also or instead specify automatic wrapping of predetermined file types from the sender, automatic wrapping of files from predetermined origins, or automatic wrapping based on any suitable objective critieria for, e.g., a recipient, a recipient domain, a file type, a file location, file metadata, and so forth.

As shown in step 1608, the method 1600 may include attaching the portable encrypted container to the communication in order to resume the communications as originally initiated by the sender. This restores the communication to its original form, except with the portable encrypted container in place of the original attachment.

As shown in step 1610, the method 1600 may include transmitting the communication and the portable encrypted container to the recipient. This may include sending an electronic mail, a text message, a file transfer, or any of the other communications contemplated herein.

As shown in step 1612, the method 1600 may include communicating the password to the recipient through a second communication medium. This may include sending the password in a second, follow-up email or the like. However, it may be more secure to send the password using a different communication medium, such as by sending the password with a text when the attachment is sent with an electronic mail message. More generally, the second communication may be different from a first communication medium bearing the communication and the attachment. The password may also or instead be locally stored on the sender's device, e.g., in a password log or the like, or in a remote, secure resource accessible to the sender, or the password may be communicated to the sender for archival purposes, such as within an electronic mail or text message. In another aspect, no record is made of the recovery password so that the password is transitory in nature.

The foregoing method may be implemented in any of a number of network devices such as an endpoint, a client device operated by the sender, an enterprise gateway, an electronic mail server, and so forth. Thus in one aspect there is disclosed herein a network device such as any of the devices or endpoints described herein including a first interface for receiving communications, a second interface for sending communications over a data network, a memory, and a processor. The processor may be configured by computer executable code stored in the memory to secure network communications by performing the steps of receiving a communication from a sender through the first interface for communication to a recipient, the communication including a file coupled to the communication as an attachment, removing the attachment from the communication, wrapping the attachment into a portable encrypted container that contains an encrypted instance of the file, an encrypted instance of a decryption key to decrypt the file, and program code providing a user interface that supports a first mode of decryption using remote resources and authentication credentials for the recipient and a second mode of decryption based on local receipt of a password for decrypting the decryption key, attaching the portable encrypted container to the communication, and transmitting the communication and the portable encrypted container to the recipient through the second interface.

Figure 17:
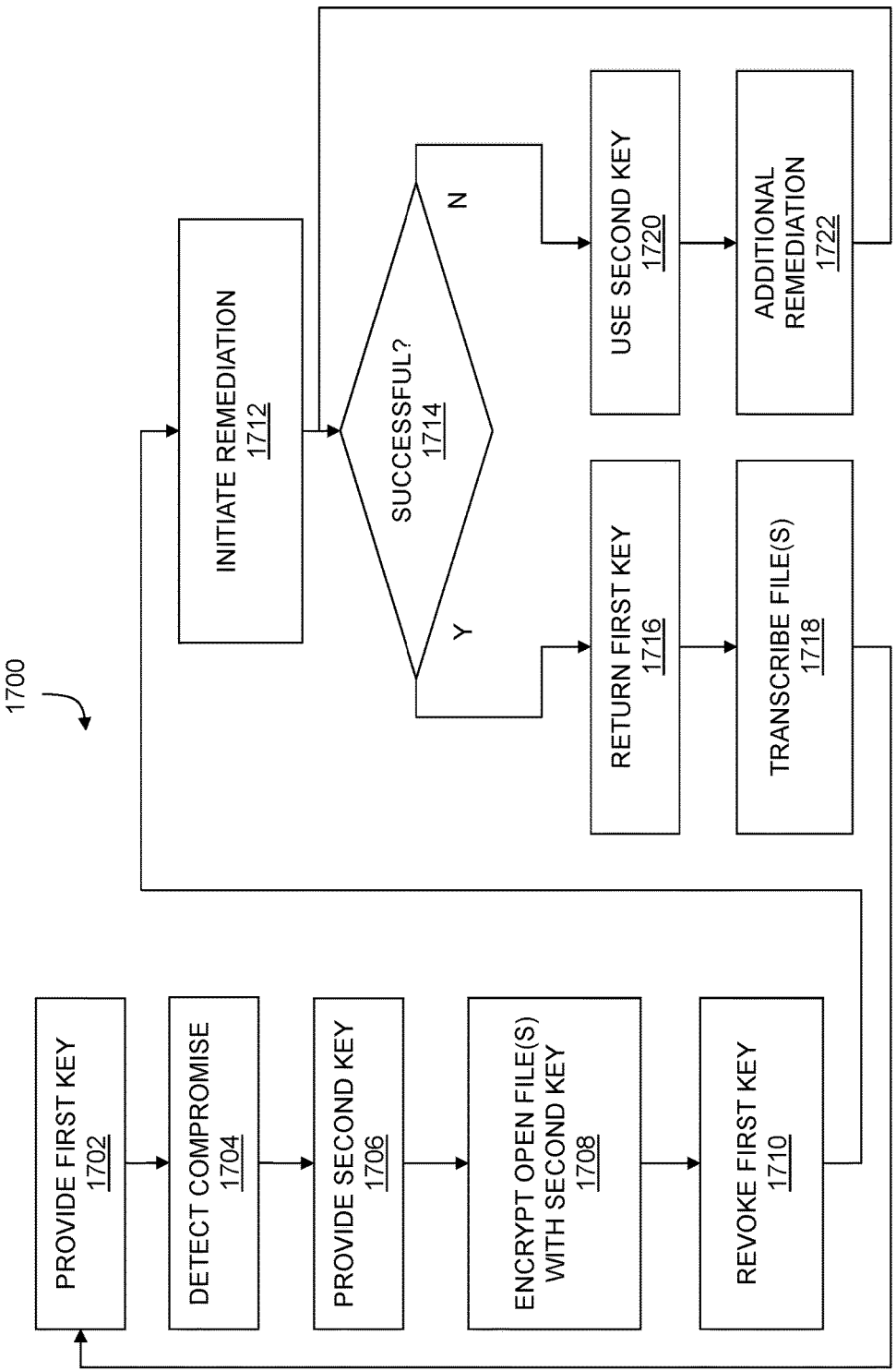
FIG. 17 shows a method for intermediate encryption of potentially exposed content.

FIG. 17 shows a method for intermediate encryption of potentially exposed content. A variety of techniques are contemplated herein for managing encryption in order to secure data on an endpoint, such as the techniques described above with reference to FIG. 5. While these techniques may advantageously protect data in various circumstances, it is also possible for encrypted data to become exposed, or potentially exposed in various circumstances, such as when a process opens an encrypted/protected file before the process is recognized as unsafe. Under these circumstances, it may be useful to remove the affected files from an otherwise secure environment, without fully decrypting and exposing the data in the affected files. In order to achieve this objective, a file system may apply a temporary, intermediate encryption that remains in force until an exposure or other compromising event can be remediated, after which the file(s) can be returned to a secure, encrypted environment used for other files that are not compromised.

As shown in step 1702, the method 1700 may include providing a first key to a process executing on an endpoint, the first key providing access to a plurality of files on the endpoint. Using this key, the process may access files within a secure or protected file area, which may be a folder, a group of folders, a directory, a detachable storage, an entire hard drive, or any other file location or combination of locations. As described above, this may include controlling access to key material through a mount point, file system filter, or other file system extension or the like that applies rules and conditionally provides encryption/decryption according to security states and other information. The first key may more generally be an encryption or decryption key for access to files within a secure environment with access controlled by the file system extension. It will be appreciated that the term "key," as used in reference to this figure, may refer to a symmetric key, in which case the key is the same for both encryption and decryption, or to an asymmetric key, in which case a key includes both an encryption key used to encrypt data and a corresponding decryption key to decrypt the data. While the following text does not distinguish between these key types, either type of key may be usefully employed with the systems and methods describe below, and either type of key is intended to fall within the scope of a "key" as contemplated herein.

As shown in step 1704 the method 1700 may include detecting a potential security compromise to the endpoint. A wide range of techniques are known in the art for detecting actual or potential security compromises, and any such techniques may be adapted for use as a detection tool including the various techniques described herein. For example, detecting the potential security compromise to the endpoint may include identifying a compromised state on the endpoint, such as by identifying malicious software based on static analysis or identifying malicious software based on behavioral analysis. Detecting the potential security compromise to the endpoint may also or instead include identifying a compromised state of the process that is using the file. Detecting the potential security compromise to the endpoint may also or instead include detecting an exposure of the process to an unknown data source. Furthermore, it will be noted that the description accompanying FIG. 17 refers generally to a "potential security compromise," suggesting that the detection may be based, e.g., on an elevated but unconfirmed inference of malicious activity or other circumstances suggesting a possible threat. However, the techniques described herein may also or instead be used in instances of actual, confirmed security compromises, and the phrase "potential security compromise" should be understood in this context to refer to potential and actual security compromises.

As shown in step 1706, the method 1700 may include providing a second key to the process different than the first key. In general, this second key can provide security to the potentially compromised data by protecting the data against further unauthorized access, while still preventing the process that is potentially compromised from accessing additional files or data that are secured with the first key.

As shown in step 1708, the method 1700 may include encrypting a first one of the plurality of files that is open by the process with the second key.

As shown in step 1710, the method 1700 may include revoking the first key from the process to prevent access to other ones of the plurality of files by the process. It will be appreciated that various levels of compromise may be detected and addressed with the techniques contemplated herein. In the case of a severe compromise the first key may be completely revoked from the endpoint. This may, for example, include deleting the first key from the endpoint so that no other files encrypted with the first key can be accessed, and the only available file operations become use of files that are already open and the creation of new files (for use with the second key). This technique advantageously permits quick and effective isolation of all data that is protected by encryption with the first key, while also permitting continued operation of the endpoint, where processes can continue to use any files that are currently open with the second key. As an additional measure, the first key may be physically removed from the endpoint using, e.g., data shredding techniques such as overwriting to ensure that the relevant key material cannot be recovered from physical storage on the endpoint.

As shown in step 1712, the method 1700 may include initiating remediation of the potential security compromise. Numerous malware remediation techniques are known in the art, and may be adapted for remediation as contemplated herein. This may, for example include preparatory steps such as storing the first one of the plurality of files after encryption with the second key and before initiating remediation so that file(s) can be stored in a secure, non-volatile state as necessary or helpful during remediation. Remediation may also include various types of user interaction. For example, a pop up, dialogue box, or other user notification feature may inform a user of a potential compromise, and notify the user of necessary steps for remediation, e.g., a restart of a process, closing of a file, restart of a machine, or other step or combination of steps. The dialogue box may also offer to perform these steps for the user, or notify the user that no new files can be opened until the remediation is performed.

As shown in step 1714, the method 1700 may include determining whether the remediation is successful. If the remediation is successful, then the method 1700 may proceed to step 1716 for a return to normal (uncompromised) operations. If the remediation is unsuccessful, then the files may be retained in the intermediate encryption state (with the second key) as shown in step 1720 until further actions can be taken.

As shown in step 1716, when a remediation successfully resolves a compromised or potentially compromised state, the method 1700 may include returning the first key to the process. This may include recovering the first key from a remote key management system or otherwise retrieving and/or restoring access to the first key by the process, e.g., view a file system filter or the like.

As shown in step 1718, the method 1700 may include transcribing the first one of the plurality of files for access using the first key. If the file is in use by the process and thus in a plaintext state, this may include encrypting the file with the first key and storing the file in this encrypted state. If the file has been closed, e.g., as a result of normal file operations, as a precursor to remediation, or for some other reason, then the file may be decrypted using the second key and then encrypted using the first key for return to the secure file system. In either case, this may include deleting the second key and saving the file that is encrypted with the first key, after which the method 1700 may return to normal operation (e.g., step 1702) where the (remediated) process has access to the file using the first key and new compromises or potential compromises can be detected.

As shown in step 1720, the method 1700 may include continuing use of the second key unless or until the compromised state can be resolved. As shown in step 1722, remediation efforts may be repeated, or additional, different remedial measures may be attempted where initial remediation efforts are unsuccessful. After various remediation efforts, the method 1700 may return to step 1714 where an additional determination may be made as to whether the remediation is successful.

In one aspect, there is disclosed herein a system implementing the techniques above to control access by processes to potentially compromised files and data. The system may include an endpoint, a first memory on the endpoint storing a first key, a second memory on the endpoint storing a plurality of files encrypted by the first key, a process executing on a processor on the endpoint, the process using the first key to access a first one of the plurality of files, and a security agent executing on the processor and configured to detect a potential security compromise to the endpoint using any of the techniques described above. The processor may in turn be configured to respond to the potential security compromise by encrypting the first one of the plurality of files with a second key different from the first key, providing access by the process to the second key, and revoking the first key from the process to prevent access by the process to other ones of the plurality of files. As further describe above, the processor may be configured to initiate a remediation of the potential security compromise, and to respond to a successful remediation of the potential security compromise by returning the first key to the process for access to the plurality of files.

Figure 18:
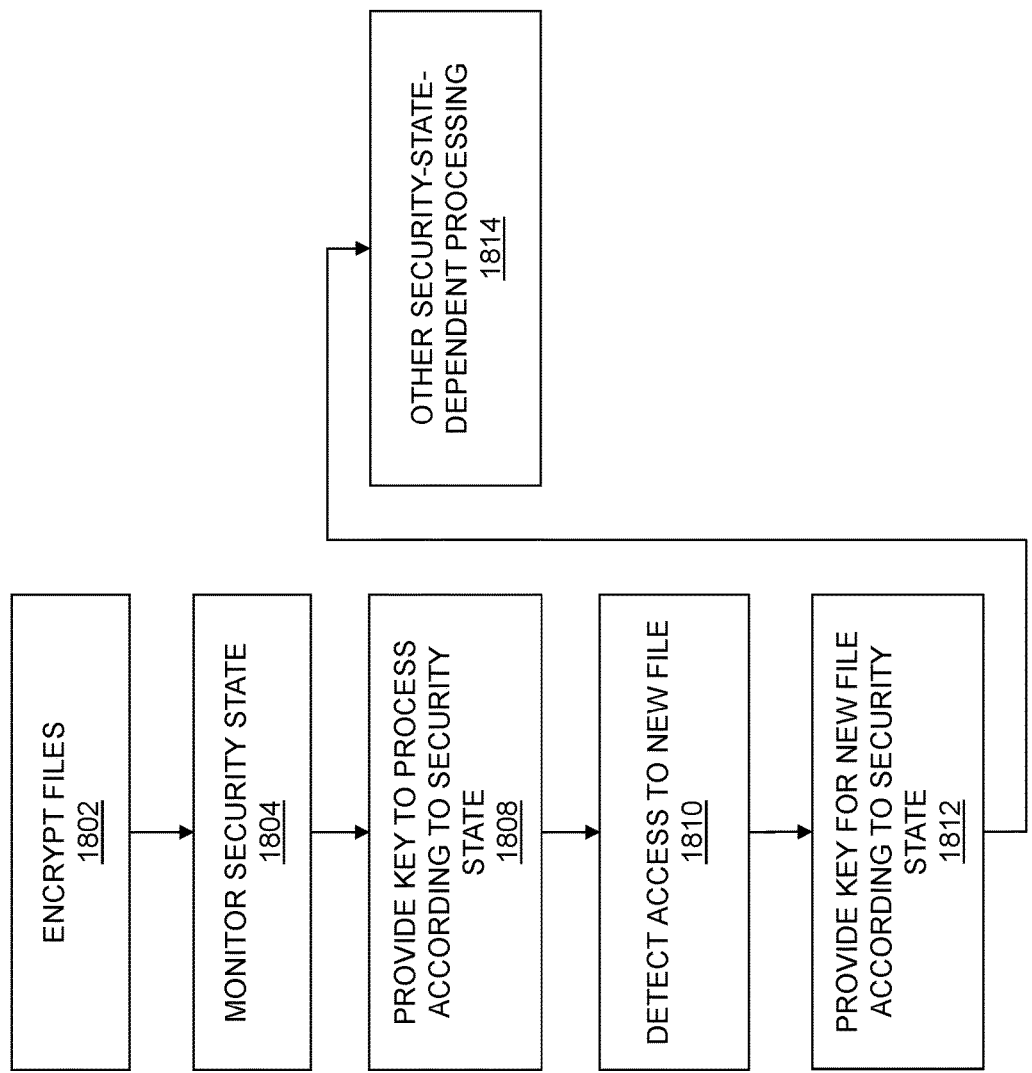
FIG. 18 shows a method for just-in-time encryption of data.

FIG. 18 shows a method for just-in-time encryption of data. Many of the techniques described above can be used to secure data on an endpoint by encrypting files with a key and controlling access to the key through a mount point, file system filter, or other file system extension as described above. However, for various reasons, such as when a new storage device is attached or when an endpoint is initially converted to use with these encryption techniques, there may be files that are not yet encrypted for data protection. In these circumstances, it may be useful to provide for just-in-time encryption of new files when they are first detected, for example so that a secure process can work with secure and unsecure files at the same time (by immediately securing the unsecure files). The following method 1800 facilitates process execution in this type of hybrid data or file environment.

As shown in step 1802, the method 1800 may include encrypting a plurality of files on an endpoint with a key to provide a plurality of encrypted files. This may, for example, use any of the techniques described herein. In general control of encryption and decryption for this group of encrypted files may be controlled through a mount point, file system filter or other file system extension as described above.

As shown in step 1804, the method 1800 may include monitoring a security state of the endpoint. A wide range of techniques are known in the art for monitoring a security state, e.g., by monitoring for the presence of malware on an endpoint, and any such techniques may be adapted for use as a security state monitoring tool as contemplated herein. For example, monitoring the security state may include monitoring the security state and identifying malicious software or the like with static analysis. Monitoring may also or instead include monitoring the security state with behavioral analysis. For a suitably instrumented endpoint, e.g., an endpoint that uses coloring as described above, this may also or instead include monitoring an exposure of a process to an unknown data source such as an unrecognized file, a URL of low or unknown reputation, another process executing on the endpoint that provides data to or receives data from the process, and so forth. Monitoring may also or instead include remotely monitoring a heartbeat of the endpoint as described herein. Monitoring may also or instead include monitoring network traffic originating from the endpoint at a gateway for an enterprise network that includes the endpoint. More generally, any techniques for detecting the presence or use of malware or the like on an endpoint may be adapted to monitor an endpoint as contemplated herein.

Monitoring the security state of the endpoint may include monitoring the endpoint generally, or monitoring specific processes such as a process that is accessing encrypted files or a process that is accessing an unrecognized file for the first time, e.g. a file that is outside the group of encrypted files described above. In general, monitoring may be performed continuously or periodically, and multiple monitoring processes may be executed concurrently or sequentially, and may be executed on some predetermined schedule or in response to other detected or observed events on the endpoint. Furthermore, monitoring may be continued while other steps are performed. That is, when a compromise is detected as described below, monitoring may resume while additional, remedial steps are initiated to address the detected compromise.

As shown in step 1806, the method 1800 may include providing a key for decryption of the files according to the security state determined in step 1804. This may for example include providing the key to a process executing on the endpoint whenever the security state of the endpoint is not compromised and revoking the key from the process whenever the security state of the endpoint is compromised. This control of access to the key and encrypted content may be implemented, for example, using a mount point, file system filter or other file system extension as described above. Thus the method 1800 may include providing the key to the process by decrypting files with the key using a file system filter coupled between the process and a file system of the endpoint, or by decrypting files with the key at a mount point coupled between the process and a file system of the endpoint.

If the endpoint becomes severely compromised, for example with malware such as ransomware or an advanced persistent threat enabling remote access and control, then the key may be revoked from the endpoint. This may include complete revocation so that no further action can be taken on the encrypted files, or this may include an incremental revocation wherein access to open files is maintained but no additional files can be opened. In another aspect, shadow copies of open files may be created so that executing processes can continue to execute while encrypted files are isolated from further manipulation. In one aspect, revoking the key from the endpoint may further include physically removing the key from the endpoint to prevent any and all access to encrypted files. The method 1800 may also include returning the key to the endpoint if the endpoint is remediated, such as by recovering the key from a remote management system.

As shown in step 1810, the method 1800 may include detecting access to a new file by the process. This may, for example, be any file other than one of the encrypted files that already been encrypted in step 1802, such as a file copied or moved from a remote directory but not yet accessed by any process on the endpoint, or a file on the endpoint that has not already been encrypted by a background process responsible for encrypting all of the files on the endpoint. Although not illustrated in FIG. 18, it will be appreciated that in general, where no access to a new file is detected, the method 1800 may return to step 1802 where background encryption may be performed, or to step 1804 where the security state of the endpoint is monitored.

As shown in step 1812, the method may include providing a key for access to the new file according to the security state detected in step 1804. In general, this may include encrypting the new file with the key immediately upon access by the process if the security state of the endpoint is not compromised so that the new file can be added to the encrypted files created in step 1802. By contrast, if the security state of the endpoint is compromised, this may include withholding the key and excluding the new file from the encrypted files.

As shown in step 1814, a number of additional steps may be performed for a compromised endpoint. This may, for example, include remedial measures such as terminating a process, requesting a user to restart an application, restarting an endpoint, quarantining processes or files, and so forth. As described above, the new file, and any other files opened by a process may optionally be encrypted with a second key temporarily in order to isolate the process and files from other encrypted files on the endpoint. After successful remediation, these files may be decrypted as required and then encrypted with the key to add them to the plurality of encrypted files created in step 1802.

An endpoint may be configured to apply the techniques described above for just-in-time encryption of new files that are detected on the endpoint. Thus, in one aspect there is disclosed herein a system including an endpoint, a first memory on the endpoint storing a key, a second memory on the endpoint storing a plurality of files encrypted by the key, a process executing on a processor on the endpoint, and a security agent executing on the processor. The security agent may be configured as generally described above to monitor a security state of the endpoint and to detect a potential security compromise of the endpoint, where the processor is configured to detect an access to a new file other than one of the plurality of files, and if the security state of the endpoint is not compromised, to encrypt the new file with the key immediately upon access by the process to add the new file to the plurality of files encrypted by the key. The system may also include a remote management facility configured to remotely monitor the security state of the endpoint based on a heartbeat received from the endpoint. The system may also or instead include an enterprise gateway configured to remotely monitor the security state of the endpoint based on network traffic originating from the endpoint.

Figure 19:
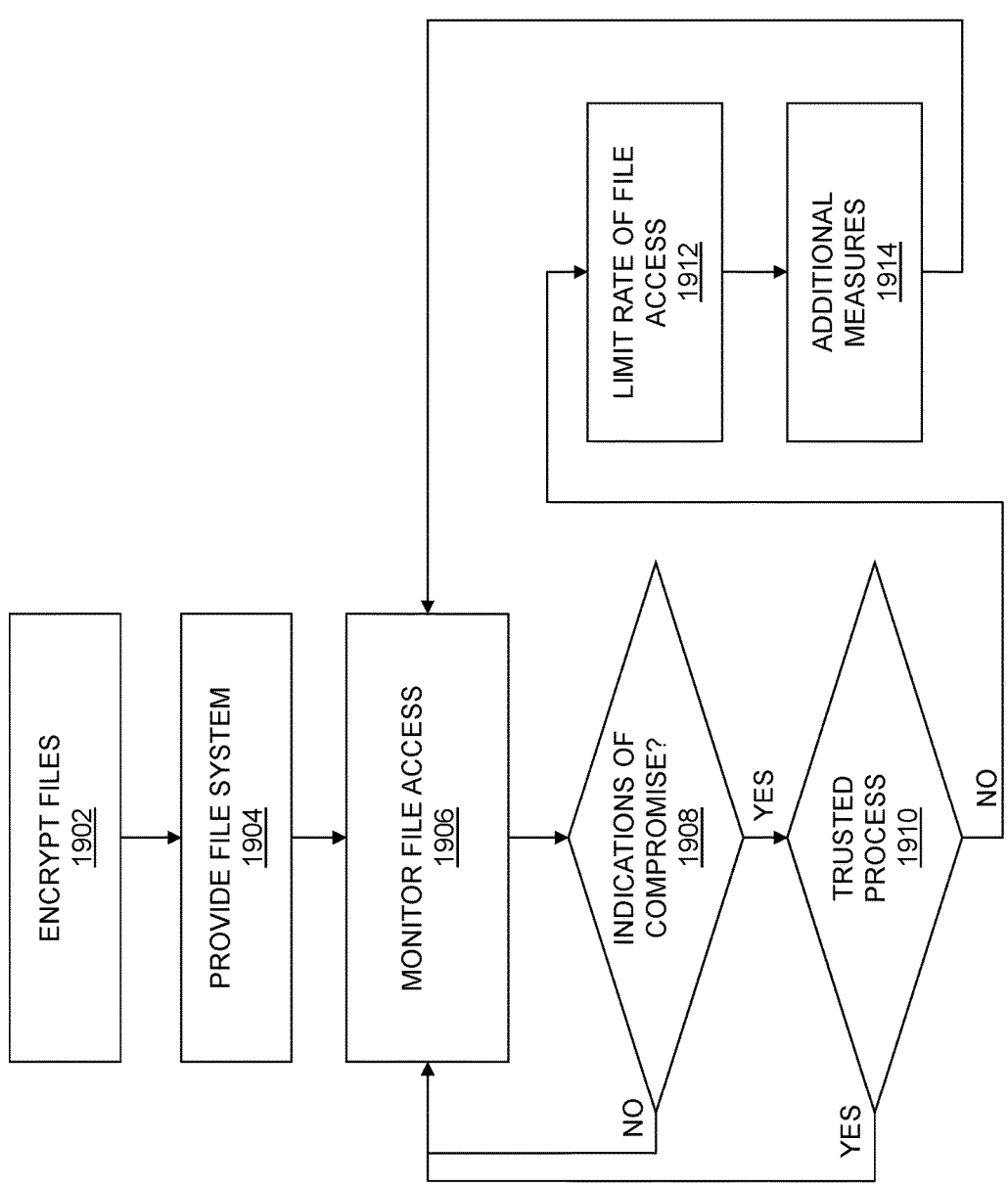
FIG. 19 shows a method for key throttling to mitigate unauthorized file access.

FIG. 19 shows a method for key throttling to mitigate unauthorized file access. In general, a file system extension such as a file system extension (e.g., filter, mount point, network interface, etc.) as described above or any suitable interface between a user, operating system, or device, on the one hand, and a data store on the other hand, may control file access by regulating the rate at which files are decrypted for processes, e.g., by limiting the number of files that can be decrypted, for example, at one time, at one or more times, over a predetermined time period or over some predetermined window, or by limiting the speed or rate at which decryption is performed on each of one or more files, or some combination of these, any of which is generally referred to herein as "key throttling." For example, when endpoint, device, or process activity such as an unusual pattern of file accesses, suggests that an endpoint is or might be compromised, this capability may be used to constrain file access until the security state can be determined with greater confidence or, in the instance of a confirmed compromise, the security state can be remediated.

As shown in step 1902, the method 1900 may include encrypting a plurality of files on an endpoint to provide a plurality of encrypted files that can be decrypted with a key. This may, for example, include encrypting the files using a file system extension for a file system as generally described herein, or otherwise placing the files in an encrypted state.

As shown in step 1904, the method 1900 may include providing a file system for accessing the files. It will be appreciated that, where the file system, or a file system extension for the file system, is used to control the encryption process, this step 1904 may be initiated before the encryption begins. In general, the file system is used for accessing the files with processes executing on the endpoint. As generally described herein, the file system may include a file system extension that applies the key to decrypt one of the files when the file is requested by one of the processes executing on the endpoint. While these steps describe a single key that is used for encryption and decryption, it will be understood that the "key" in this context may include an assymetric key pair where one piece of key material in the "key" is used for encryption and another piece of key material is used for decryption. The key also may be used to decrypt a key to be used to decrypt a file or files, with one or more layers of decryption of keys required.

As shown in step 1906, the method 1900 may include monitoring file access. More specifically, the file system or file system extension may be instrumented to specifically monitor the source, quantity, or other parameters of file accesses over time, in order to detect a pattern of access to files that causes a potential indication of compromise. While a pattern of access to files may provide one useful measure for detecting a compromise that can be advantageously addressed with key throttling as contemplated herein—e.g., because the nature of the compromise may manifest as and rely on rapid access to numerous files in rapid succession— it will be understood that other potential indicators of compromise for files, process, or an endpoint in general, may also or instead be used to control when key throttling is deployed.

As shown in step 1908, if there is no indication of compromise, the method 1900 may return to step 1906 where file monitoring may continue. If an indication of compromise is detected, the method 1900 may proceed to step 1910 where additional actions may be initiated.

The pattern used for detecting the indication of compromise may be any pattern of file access or other behaviors suggesting malicious activity. For example, the pattern of access to the files may include a communication of the files to a location remote from the endpoint, such as would be typical of a malicious data exfiltration process. In another aspect, the indication of compromise may include a pattern of access to the files indicating potentially malicious automated file access. In this context, automated file access might be suggested, for example, by a rate of file accesses that would not be possible by a human user opening files or the like, or any other similar pattern suggesting an organization or frequency of file accesses that would not be possible by a human user. Such patterns of behavior may be quantified using any number of parameters. For example, the indication of compromise may include access to a number of files beyond a predetermined threshold within a predetermined time interval. Thus, targets or limits for unusually large numbers of file access and/or an unusually short window for multiple file accesses may be used alone or in combination to parameterize potentially malicious activity. These parameters may be manually set, e.g., by an administrator, or empirically derived based on a history of local activity on the endpoint or typical behavior among a group of endpoints, users, and so forth. The predetermined threshold for the number of files may also or instead specify a type of file. In other words, the threshold may only apply to word processing documents, spreadsheet documents, databases, or some other type or combination of types. The type of file may, for example, include an application type associated with such files, a file extension associated with such files, or any other file data or metadata useful for characterizing file types or the related applications.

The predetermined threshold for the number of files may also or instead specify a number of types of files. That is, only certain types of files may count toward the threshold in the aggregate. In another aspect, each type may have its own individual threshold, which may be used instead of or in addition to an aggregate threshold for all files of a certain type, or more generally all files of any type. Similarly, the predetermined threshold may specify an application requesting the number of files, e.g., by requiring that only a single application make all of the file access requests that count toward a threshold, or that a particular type of application make all such requests. Similarly, the predetermined threshold may specify an attribute of the number of files that count toward the threshold, e.g., so that only files of a certain size, age, owner, creator, type, name, and so forth are counted toward the threshold. In general, any type of file metadata may be used to provide a filter for determining whether file access meets a threshold. Thus, more subjective criteria, which may be added by or attributable to a user or process responsible for or associated with the file, may be applied as an attribute for this purpose. For example, the attribute may include a business use of a document (e.g., financial, engineering, legal, marketing, and so on) or a sensitivity of a document (e.g., confidential, sensitive, public, and so on).

Still more generally, any attributes, thresholds, filters, criteria, or the like may be configured to create rules for determining when a pattern of file access is potentially malicious, so that a corresponding indication of compromise may be detected. As noted above, these rules may generally seek to detect automated and/or malicious file access. As further noted, other criteria or rules for detection of a potential compromise may also or instead be applied. The indication of compromise may also or instead be based on a rule for detecting automated behavior, which may employ thresholds as discussed herein, or any other metrics, behaviors, observable events, and so forth for the endpoint. In another aspect, the indication of compromise may be based on other potentially unsafe conditions such as a detection of a removable storage drive coupled to the endpoint.

As shown in step 1910, an exception may be provided to an indication of compromise for a trusted process. For example, where a particular process is known and trusted, such as a backup process of high reputation, the process may be permitted to access many files at high frequency, and an exception may be permitted to the rules for determining indications of compromise. Where an exception is appropriate, the method 1900 may return to step 1906 where file monitoring may continue. Where no exception is appropriate, the method 1900 may proceed to 1912 where further action may be taken.

As shown in step 1912, when a potential indication of compromise has been detected, the file system extension that provides access to decrypted file content may limit a rate of access to the files, e.g., by regulating the rate at which decryption is performed or by restricting the number of files that can be decrypted at one time, or within some predetermined window, or otherwise restricting the frequency of rate of responses to requests from the file system. It will be appreciated that the rate may be varied dynamically. Thus, for example, the rate may be adjusted according to the strength of a particular indication of compromise. Or the rate may be slightly reduced (e.g., to a certain percentage below a maximum allowed) when there is suspicious behavior without a conviction of malicious behavior. This may permit continued monitoring of a developing and potentially malicious pattern of behavior without completely suspending file access. Applications that do not access many files may be able to run with potentially minimal impact, but applications that do access many files will be slowed or even stalled.

As shown in step 1914, the method 1900 may include any of a number of additional measures to the potential or actual indication of compromise. For example, the method 1900 may include presenting an interactive user interface element in a display on the endpoint requesting a confirmation that a human user initiated an activity causing the pattern of access, for example, by requiring user action or interaction, or requiring authentication, or more generally providing a notification in a display on the endpoint about the indication of potential compromise. This may be particularly advantageous, for example, where a strong conviction cannot be reached with respect to the state of compromise, but where some type of potentially malicious and/or automated file access or other behavior appears to be present. This may also or instead be applicable where the indication of compromise is based on a suspiciously large number of file access requests, such as access to a number of files beyond a predetermined threshold within a predetermined time interval as discussed herein.

In another aspect, the additional measures may include dynamically tuning the detection rules according to a history of behavior or current conditions. Thus, for example, the method 1900 may include adjusting at least one of the predetermined threshold and the predetermined time interval described herein according to a pattern of file access. This may be particularly useful where a weak conviction of compromise is reached. In such circumstances, there may be an elevated indication of compromise based on a large number of file accesses, but no other indicia of malicious activity. In such instances, the predetermined threshold may be reduced, or the window varied, in order to increase sensitivity while a final conclusion is pending. Detection rules may be based at least in part on the time of day, week, month, year, and so on. For example, a first behavior may be permitted during the work day, and another behavior outside of work hours.

Other steps may also or instead be taken such as remediation of the endpoint, quarantining any offending processes, scanning of affected files, and so forth. After any additional measures have been taken, the method 1900 may return to step 1906 where monitoring of file access may resume.

In one aspect, there is disclosed herein a system that implements the above method 1900. This may, for example, include an endpoint, a first memory on the endpoint storing a key, and a second memory on the endpoint storing a plurality of files that can be decrypted by the key. The endpoint may include a file system for accessing the plurality of files, the file system including a file system extension that applies the key to decrypt a requested one of the plurality of files in response to a request from a process executing on the endpoint. The endpoint may also include a processor configured, e.g., by computer executable code stored on the endpoint and executable by the processor, to monitor the endpoint for an indication of compromise, and to limit a rate of access to the plurality of files by the file system extension in response to the indication of compromise.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for throttling access to encrypted files in response to potentially malicious activity, the computer program product comprising computer executable code embodied in a non-transitory computer readable medium that, when executing on one or more computing devices, performs the steps of:
    encrypting a plurality of files on an endpoint to provide a plurality of encrypted files that can be decrypted with a key;
    providing a file system for accessing the plurality of files with one or more processes executing on the endpoint, wherein the file system includes a file system extension that functions to conditionally provide decryption of the encrypted files based on a current security state of the endpoint, the file system extension using the key to decrypt a requested one of the plurality of files in response to a request from one of the one or more processes for the requested one of the files;
    monitoring access to the plurality of files by the one or more processes for a potential indication of compromise; and
    limiting a rate at which the file system extension uses keys to decrypt the files when a pattern of access to the files indicates potentially malicious automated file access.

2. The computer program product of claim 1 further comprising code that performs the step of presenting an interactive user interface element in a display on the endpoint requesting a confirmation that a human user initiated an activity causing the pattern of access.

3. The computer program product of claim 1 wherein the pattern of access to the files includes a communication of one or more of the plurality of files to a location remote from the endpoint.

4. A method comprising:
    encrypting a plurality of files on an endpoint to provide a plurality of encrypted files that can be decrypted with a key;
    providing a file system for accessing the plurality of files with one or more processes executing on the endpoint, wherein the file system includes a file system extension that functions to conditionally provide decryption of the encrypted files based on a current security state of the endpoint, the file system extension using the key to decrypt a requested one of the plurality of files in response to a request from one of the one or more processes for the requested one of the files;
    monitoring access to the plurality of files by the one or more processes for a potential indication of compromise; and
    when an indication of compromise is detecting, limiting a rate at which the file system extension uses keys to decrypt the files.

5. The method of claim 4 wherein the indication of compromise includes a pattern of access to the files indicating potentially malicious automated file access.

6. The method of claim 4 wherein the indication of compromise includes access to a number of files beyond a predetermined threshold within a predetermined time interval.

7. The method of claim 6 wherein the predetermined threshold specifies a type of file.

8. The method of claim 7 wherein the type of file includes an application type associated with one or more of the number of files.

9. The method of claim 6 wherein the predetermined threshold specifies a number of types of files.

10. The method of claim 6 wherein the predetermined threshold specifies an application requesting the number of files.

11. The method of claim 6 wherein the predetermined threshold specifies an attribute of the number of files.

12. The method of claim 11 wherein the attribute includes a business use or a sensitivity of a document.

13. The method of claim 6 further comprising presenting a notification in a display on the endpoint about the indication of compromise.

14. The method of claim 6 further comprising presenting an interactive user interface element in a display on the endpoint requesting a confirmation that a human user initiated an activity causing the indication of compromise.

15. The method of claim 6 further comprising adjusting at least one of the predetermined threshold and the predetermined time interval according to a pattern of file access.

16. The method of claim 4 wherein the indication of compromise is based on a rule for detecting automated behavior.

17. The method of claim 4 wherein the indication of compromise is based on a detection of a removable storage drive coupled to the endpoint.

18. The method of claim 4 further comprising providing an exception to the indication of compromise for a trusted process.

19. A system comprising:
an endpoint;
a first memory on the endpoint storing a key;
a second memory on the endpoint storing a plurality of encrypted files that can be decrypted by the key;
a file system for accessing the plurality of files, the file system including a file system extension that functions to conditionally provide decryption of the encrypted files based on a current security state of the endpoint, the file system extension using the key to decrypt a requested one of the plurality of files in response to a request from a process executing on the endpoint; and
a processor configured to monitor the endpoint for an indication of compromise, and, in response to the indication of compromise, to limit a rate at which the file system extension uses keys to decrypt the files.

* * * * *